(12) United States Patent
Hasegawa

(10) Patent No.: US 10,164,813 B2
(45) Date of Patent: Dec. 25, 2018

(54) TRANSMISSION APPARATUS

(71) Applicant: Mitsubishi Electric Corporation, Chiyoda-ku (JP)

(72) Inventor: Fumihiro Hasegawa, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/559,114

(22) PCT Filed: Aug. 3, 2015

(86) PCT No.: PCT/JP2015/071983
§ 371 (c)(1),
(2) Date: Sep. 18, 2017

(87) PCT Pub. No.: WO2017/022059
PCT Pub. Date: Feb. 9, 2017

(65) Prior Publication Data
US 2018/0248733 A1    Aug. 30, 2018

(51) Int. Cl.
*H04L 27/26* (2006.01)
*H04J 11/00* (2006.01)
(Continued)

(52) U.S. Cl.
CPC .......... *H04L 27/2634* (2013.01); *H04J 11/00* (2013.01); *H04L 27/01* (2013.01);
(Continued)

(58) Field of Classification Search
CPC ............. H04L 27/2626; H04L 27/2636; H04L 27/2634; H04L 27/361
(Continued)

(56) References Cited

U.S. PATENT DOCUMENTS 9,236,927 B2 * 1/2016 Stadelmeier ......... H04B 7/0689
2001/0015954 A1 * 8/2001 Kuwabara ........... H04L 25/0232
370/206
(Continued)

FOREIGN PATENT DOCUMENTS

JP    2010-192977 A    9/2010
WO    2007/091590 A1    8/2007
(Continued)

OTHER PUBLICATIONS

Benvenuto, Nevio et al., "Single Cartier Modulation With Nonlinear Frequency Domain Equalization: An Idea Whose Time Has Come—Again", Proceeding of the IEEE, vol. 98, No. 1, Jan. 2010, pp. 69-96.
(Continued)

*Primary Examiner* — Emmanuel Bayard
(74) *Attorney, Agent, or Firm* — Oblon, McClelland, Maier & Neustadt, L.L.P.

(57) ABSTRACT

A transmission apparatus includes a data-block generating unit that generates and outputs a data block including fixed sequence symbols whose signal values are formed of a fixed sequence and data symbols, a pilot-block generating unit that generates and outputs a pilot block including the fixed sequence symbols and pilot symbols that are fixed symbols known on a reception side, and an output control unit to which the data block and the pilot block are inputted, which controls whether the data block or the pilot block is outputted.

6 Claims, 28 Drawing Sheets

(51) Int. Cl.
*H04L 27/01* (2006.01)
*H04L 27/36* (2006.01)

(52) U.S. Cl.
CPC ...... *H04L 27/2605* (2013.01); *H04L 27/2613* (2013.01); *H04L 27/2688* (2013.01); *H04L 27/361* (2013.01)

(58) Field of Classification Search
USPC .......................................... 375/260–261, 295
See application file for complete search history.

(56) References Cited

U.S. PATENT DOCUMENTS

| | | | |
|---|---|---|---|
| 2008/0232504 A1* | 9/2008 | Ma | H04L 5/0023 375/267 |
| 2009/0052427 A1 | 2/2009 | Oketani et al. | |
| 2009/0075700 A1* | 3/2009 | Fukuoka | H04B 7/0682 455/561 |
| 2009/0190516 A1* | 7/2009 | Fukuoka | H04L 27/2613 370/312 |
| 2010/0046360 A1* | 2/2010 | Tsuboi | H04J 11/0069 370/210 |
| 2010/0054211 A1* | 3/2010 | Gaal | H04J 13/0025 370/335 |
| 2011/0305286 A1 | 12/2011 | Shimezawa et al. | |
| 2014/0286463 A1* | 9/2014 | Reingold | H04B 7/0456 375/347 |

FOREIGN PATENT DOCUMENTS

| | | |
|---|---|---|
| WO | 2010/079757 | 7/2010 |
| WO | 2011/015119 A1 | 2/2011 |

OTHER PUBLICATIONS

Bingham, John A. C., "*Multicarrier Modulation for Data Transmission: An Idea Whose Time Has Come*", IEEE Commun. Mag., vol. 28, No. 5, May 1990, pp. 5-8, 11-14.

Hasegawa, Fumihiro, et al., "*Static Sequence Embedded DFT-s-OFDM*", IEICE Technical Report, vol. 28, No. 490, RCS2014-326, Mar. 2015, pp. 147-152.

Porat, Boaz, "*A Course in Digital Signal Processing*", John Wiley and Sons Inc., 1997, pp. 106-107.

Jiang, Yong, et al. "*A New Out-Of-Band Power Suppression Scheme by Extending Effective Cyclic-Prefix of OFDM*", IEEE VTC2010—Spring, pp. 1-5.

Hasegawa, Fumihiro, et al. "*Novel Dynamic and Static Methods for Out-of-Band Power Suppression in SC-OFDM*", Wireless Communications Letters, IEEE, vol. 4, Issue 3, Jun. 2015, pp. 313-316.

International Search Report dated Oct. 20, 2015 in PCT/JP2015/071983, filed Aug. 3, 2015.

\* cited by examiner

TRANSMISSION APPARATUS

FIELD

The present invention relates to a transmission apparatus in a single carrier block transmission system.

BACKGROUND

In a digital communication system, frequency selectivity and temporal fluctuation of a transmission path occur because of multipath fading caused when a transmission signal reflects on buildings or the like or of Doppler fluctuation caused by movement of a terminal. In such a multipath environment, a reception signal becomes to a signal interfering with a transmission symbol and a symbol that arrives after the elapse of a delay time.

In the transmission path having such frequency selectivity, a single carrier (SC) block transmission system has attracted attention in recent years to obtain a best reception characteristic (see, for example, Non-Patent Literature 1). In the SC block transmission system, it is possible to reduce peak power as compared with an OFDM (Orthogonal Frequency Division Multiplexing) transmission system (see, for example, Non-Patent Literature 2) that is directed to multi-carrier (Multiple Carrier: MC) block transmission.

In a transmitter that performs SC block transmission, for example, a multipath fading countermeasure takes place by performing transmission explained below. First of all, after a PSK (Phase Shift Keying) signal or QAM (Quadrature Amplitude Modulation) signal that is a digital modulation signal is generated in a "Modulator", the digital modulation signal is converted into a time domain signal by a precoder and an IDFT (Inverse Discrete Fourier Transform) processing unit. Thereafter, a CP (Cyclic Prefix) is inserted in a CP inserting unit as a multipath fading countermeasure. The CP inserting unit copies a specified number of samples behind the time domain signal and adds the samples to the beginning of a transmission signal. To suppress transmission peak power, in the transmitter that performs the SC transmission, in general, DFT (Discrete Fourier Transform) processing is performed in the precoder.

In Non-Patent Literatures 1 and 2, the transmission peak power is suppressed while the influence of the multipath fading is reduced. However, in the SC block transmission, because phases and amplitudes between SC blocks are discontinuous, an out-of-band spectrum or out-of-band leakage is caused. The out-of-band spectrum is interference to an adjacent channel. Therefore, out-of-band spectrum suppression is necessary. A spectrum mask is determined in a general communication system, and so it is necessary to suppress the out-of-band spectrum to satisfy the spectrum mask.

Non-Patent Literature 3 proposes a technique of inserting symbols formed by fixed sequences into both ends of a block to suppress the out-of-band spectrum. A transmitter described in Non-Patent Literature 3 generates data symbols and fixed sequence symbols for each block and multiplexes the data symbols and the fixed sequence symbols in a time domain. The data symbol is, for example, a symbol based on a modulation system such as PSK or QAM, and changes at random. The transmitter converts the multiplexed signals into a signal in a frequency domain through DFT processing, performs interpolation processing, for example, oversampling in the frequency domain, and converts the signal into a signal in a time domain through IDFT processing. The number of inputs and outputs of a DFT unit is represented as $N_D$, the number of inputs of an interpolation processing unit is represented as $N_D$, the number of outputs of the interpolation processing unit is represented as LN, the number of inputs and outputs of an IDFT unit is represented as LN, and an oversampling rate of the oversampling that is interpolation processing is set to L times. In the transmitter, N-point IDFT processing is carried out at the time of L=1, wherein $N \geq N_D$ holds. In the case of $N-N_D>0$, a zero is inserted into an output of the DFT unit in the interpolation processing unit. As a zero inserting method, for example, a method as described in Non-Patent Literature 4 is used.

An output of the IDFT unit is referred to as "sample". The fixed sequence symbol mentioned before is formed of M symbols, in all blocks of which the same sequence is inserted in the same position. Because the same sequence is generated in generation of the fixed sequence symbols, a saved fixed sequence symbol may be read out from a memory. For the oversampling processing, any processing may be used, but in general, zero insertion or the like is used.

As explained above, $N_D$ symbols are inputted to the DFT unit, the symbols being obtained by multiplexing a data symbol and a fixed sequence symbol for one block. Because the number of symbols of the fixed sequence symbols is M, the number of symbols of the data symbols is $N_D-M$. In Non-Patent Literature 3, the M fixed sequence symbols are divided into halves. For arrangement of the fixed sequence symbols in a block, M/2 symbols in the latter half of the fixed sequence symbols are arranged in a head part of the block before the $N_D-M$ data symbols arranged in the center of the block, while M/2 symbols in the former half of the fixed sequence symbols are arranged in a tail part of the block behind the $N_D-M$ data symbols. The fixed sequence symbols can be represented as, for example, $F_{-M/2}$, $F_{-M/2+1}, \ldots, F_{-1}, F_0, F_1, \ldots, F_{M/2-2}$, and $F_{M/2-1}$. When a plurality of blocks are generated in the transmitter, the M/2 symbols $F_0, F_1, \ldots, F_{M/2-2}$, and $F_{M/2-1}$ in the latter half of the fixed sequence symbols placed in the head part of the block are continuous from the M/2 symbols $F_{-M/2}$, $F_{-M/2+1}, \ldots$, and $F_{-1}$ in the former half of the fixed sequence symbols placed in the tail part of the immediately preceding block. For example, when a m-th data symbol in a k-th block is represented as $d_{k,m}$, arrangement of the data symbols and the fixed sequence symbols before input to the DFT unit can be represented as $F_0, \ldots, F_{M/2-1}, d_{k,1}, \ldots, d_{k,ND-M}$, $F_{-M/2}, \ldots$, and $F_{-1}$ ($N_D$ is written as ND in the subscript) in the order of position from the head of the block. Any sequence may be used for the fixed sequence symbols, and a Zadoff-Chu sequence, zero, or the like may be used for the same.

In this way, the block in which the fixed sequence symbols are arranged as described in Non-Patent Literature 3 is inputted to the DFT unit, whereby phases between blocks link in an output of the IDFT unit, making it possible to suppress the out-of-band spectrum. In the example explained above, the fixed sequence symbols are arranged so that the number of symbols in the former half part is equal to the number of symbols in the latter half part. However, the number of symbols may be made different between the former half part and the latter half part.

A principle that waveform continuity is maintained by insertion of the fixed sequence symbols explained above is explained. In the block, a cyclicity phenomenon is caused by a combination of DFT processing, interpolation processing, and IDFT processing. In the cyclicity phenomenon caused by the combination of the processing, a waveform of each symbol is turned back to the opposite side of the block in the tail end of the block. By fixing first and last symbols of each block using such a characteristic, it is possible to smoothly link phases between the blocks.

CITATION LIST

Non-Patent Literature

Non-Patent Literature 1: N. Benvenuto, R. Dinis, D. Falconer and S. Tomasin, "Single Carrier Modulation With Nonlinear Frequency Domain Equalization: An Idea Whose Time Has Come-Again", Proceeding of the IEEE, vol. 98. no. 1, January 2010, pp. 69-96.

Non-Patent Literature 2: J. A. C. Bingham, "Multicarrier Modulation for Data Transmission: An Idea Whose Time Has Come", IEEE Commun. Mag., vol. 28, no. 5, May 1990, pp. 5-14.

Non-Patent Literature 3: Hasegawa et al., "DFT-s-OFDM using a fixed sequence", IEICE technical report, vol. 14, no. 490, RCS2014-326, pp. 147-152, March 2015.

Non-Patent Literature 4: B. Porat, "A Course in Digital Signal Processing", John Wiley and Sons Inc., 1997.

SUMMARY

Technical Problem

A transmission apparatus inserts a pilot symbol, that is a fixed symbol already-known in a receiving apparatus, into a transmission signal. The receiving apparatus performs estimation processing of a transmission path or synchronization processing for frame synchronization, symbol synchronization, block synchronization and the like, using the pilot symbol included in a received signal. However, in a transmission apparatus that performs SC block transmission, when there is an SC block including only pilot symbols in SC blocks to be transmitted, a problem has arisen in that discontinuity of phases occurs between the SC blocks and an out-of-band spectrum increases.

The present invention has been devised in view of the above circumstances, and an object of the present invention is to provide a transmission apparatus capable of inserting a pilot symbol into a signal to be transmitted while suppressing an increase in an out-of-band spectrum.

Solution to Problem

In order to solve the problems mentioned above and achieve the object, the present invention provides a transmission apparatus in a single carrier block transmission system. The transmission apparatus comprises a data-block generating unit to generate a data block that includes fixed sequence symbols having signal values formed of a fixed sequence and data symbols. The transmission apparatus also has a pilot-block generating unit to generate a pilot block including the fixed sequence symbols and pilot symbols that are fixed symbols known on a reception side. The transmission apparatus further has an output control unit to which the data block and the pilot block are inputted, to control a block to be outputted.

Advantageous Effects of Invention

The transmission apparatus according to the present invention achieves an effect that it is possible to insert pilot symbols into a signal to be transmitted while suppressing an increase in an out-of-band spectrum.

DESCRIPTION OF EMBODIMENTS

Transmission apparatuses according to embodiments of the present invention are described in detail below with reference to the drawings. Note that the present invention is not limited by these embodiments.

First Embodiment

Figure 1:
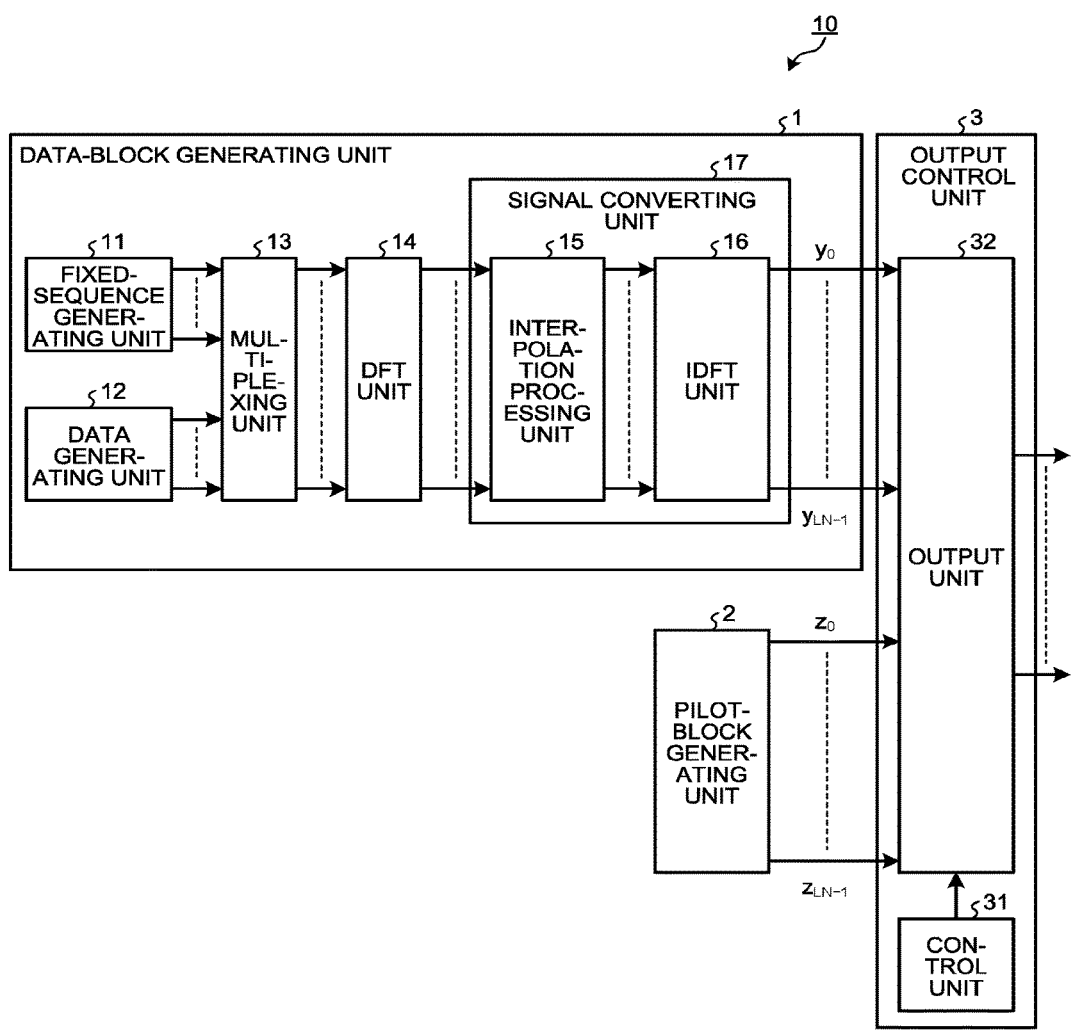
FIG. 1 is a block diagram showing a configuration example of a transmission apparatus according to a first embodiment.

FIG. 1 is a block diagram showing a configuration example of a transmission apparatus 10 according to a first embodiment of the present invention. The transmission apparatus 10 includes a data-block generating unit 1, a pilot-block generating unit 2, and an output control unit 3. Note that, in the transmission apparatus 10 shown in FIG. 1, a construction necessary for the explanation of the operation of the present invention is shown, and description concerning a construction necessary for a general transmission apparatus is omitted.

The data-block generating unit 1 generates a data block that is an SC block including fixed sequence symbols and data symbols, which is obtained by multiplexing the fixed sequence symbols and the data symbols, and outputs the generated data block to the output control unit 3. The data symbol is a symbol generated in a modulation system such as PSK or QAM. The fixed sequence symbol is a symbol having a signal value formed by a fixed sequence, which corresponds to any one of the M symbols $F_{-M/2}$, $F_{-M/2+1}, \ldots, F_{-1}, F_0, F_1, \ldots, F_{M/2-2}$, and $F_{M/2-2}$ explained in the background. The data block is a block in which data symbols are arranged in a center thereof and divided fixed sequence symbols are arranged in a head part and a tail part, respectively.

The pilot-block generating unit 2 generates a pilot block that is an SC block including fixed sequence symbols and pilot symbols, the SC block being obtained by multiplexing the fixed sequence symbols and the pilot symbols, and outputs the generated pilot block to the output control unit 3. The pilot symbol is a fixed symbol already known in a not-shown receiving apparatus.

Figure 2:
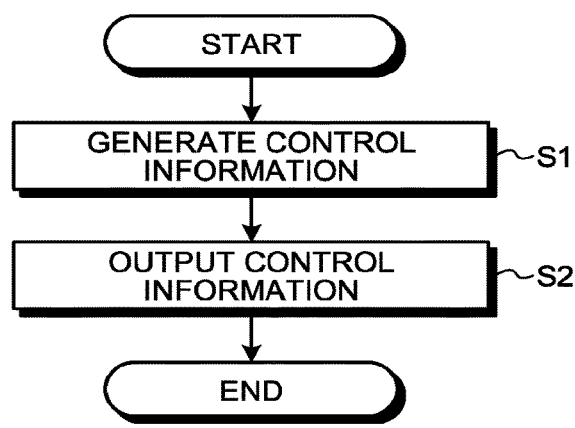
FIG. 2 is a flowchart showing the operation of a control unit of an output control unit of the transmission apparatus according to the first embodiment.
Figure 3:
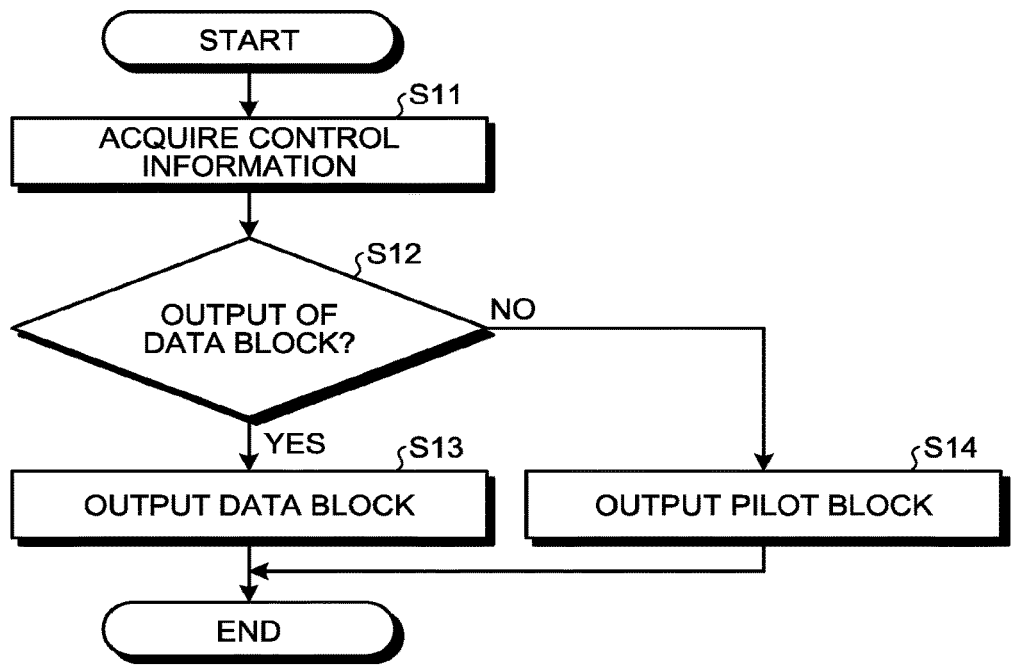
FIG. 3 is a flowchart showing the operation of the output unit of the output control unit of the transmission apparatus according to the first embodiment.

The output control unit 3 performs control to output the data block inputted from the data-block generating unit 1 or the pilot block inputted from the pilot-block generating unit 2. The output control unit 3 controls an SC block to be outputted. The output control unit 3 includes a control unit 31 and an output unit 32. The control unit 31 generates control information indicating whether the data block is to be outputted or the pilot block is to be outputted, and outputs the generated control information to the output unit 32. The output unit 32 outputs the data block inputted from the data-block generating unit 1 or the pilot block inputted from the pilot-block generating unit 2 on the basis of the control information acquired from the control unit 31. Note that the control unit 31 may further include information for controlling the operations of the data-block generating unit 1 and the pilot-block generating unit 2 in the control information, and output the information to the data-block generating unit 1 and the pilot-block generating unit 2. FIG. 2 is a flowchart showing the operation of the control unit 31 of the output control unit 3 of the transmission apparatus 10 according to the first embodiment. The control unit 31 generates the control information (step S1), and then outputs the control information to the output unit (step S2). FIG. 3 is a flowchart showing the operation of the output unit 32 of the output control unit 3 of the transmission apparatus 10 according to the first embodiment. After acquiring the control information from the control unit 31 (step S11), the output unit 32 checks content of the control information. In the case where the contents are directed to data block output (Yes at step S12), the output unit 32 outputs a data block inputted from the data-block generating unit 1 (step S13). In the case where the contents are directed to pilot block output (No at step S12), the output unit 32 outputs a pilot block inputted from the pilot-block generating unit 2 (step S14).

A detailed configuration of the data-block generating unit 1 is explained. The data-block generating unit 1 includes a fixed-sequence generating unit 11, a data generating unit 12, a multiplexing unit 13, a DFT unit 14, an interpolation processing unit 15, and an IDFT unit 16. The interpolation processing unit 15 and the IDFT unit 16 constitute a signal converting unit 17.

Figure 4:
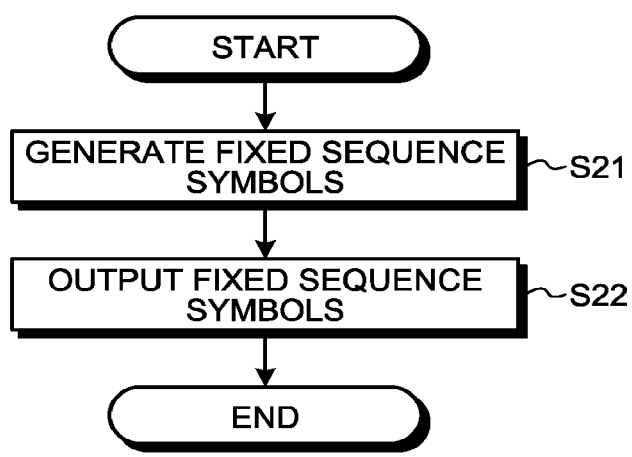
FIG. 4 is a flowchart showing the operation of a fixed-sequence generating unit of the transmission apparatus according to the first embodiment.

The fixed-sequence generating unit 11 is a fixed-sequence-for-data-block generating unit that generates fixed sequence symbols to be inserted into a pre-interpolation data block and outputs the generated fixed sequence symbols to the multiplexing unit 13. The fixed sequence symbol corresponds to any one of the M symbols $F_{-M/2}, F_{-M/2+1}, \ldots, F_{-1}, F_0, F_1, \ldots, F_{M/2-2}$, and $F_{M/2-1}$ explained in the background. The pre-interpolation data block is a block generated by the multiplexing unit 13 explained below before interpolation processing is applied by the interpolation processing unit 15. The data block is a block to which the interpolation processing is applied by the interpolation processing unit 15 and which is outputted from the IDFT unit 16. FIG. 4 is a flowchart showing the operation of the fixed-sequence generating unit 11 of the transmission apparatus 10 according to the first embodiment. The fixed-sequence generating unit 11 generates fixed sequence symbols (step S21), and then outputs a fixed sequence to the multiplexing unit 13 (step S22).

Figure 5:
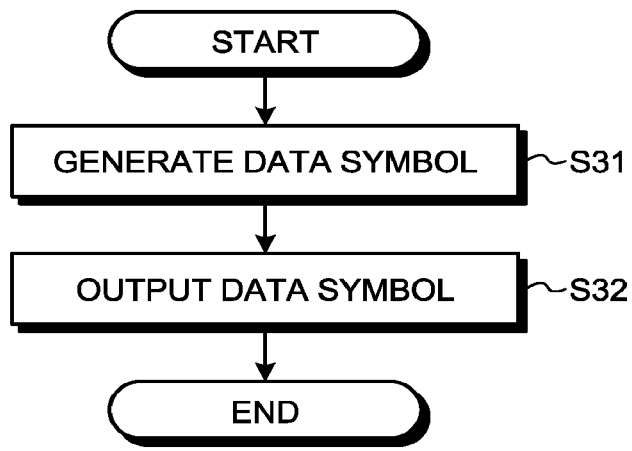
FIG. 5 is a flowchart showing the operation of a data generating unit of the transmission apparatus according to the first embodiment.

The data generating unit 12 is a data-for-data-block generating unit that generates data symbols based on a modulation system such as PSK or QAM and outputs the generated data symbols to the multiplexing unit 13. Note that the PSK, the QAM, and the like are examples, and the modulation system may be different from these modulation systems. FIG. 5 is a flowchart showing the operation of the data generating unit 12 of the transmission apparatus 10 according to the first embodiment. The data generating unit 12 generates data symbols (step S31), and then outputs the data symbols to the multiplexing unit 13 (step S32).

Figure 6:
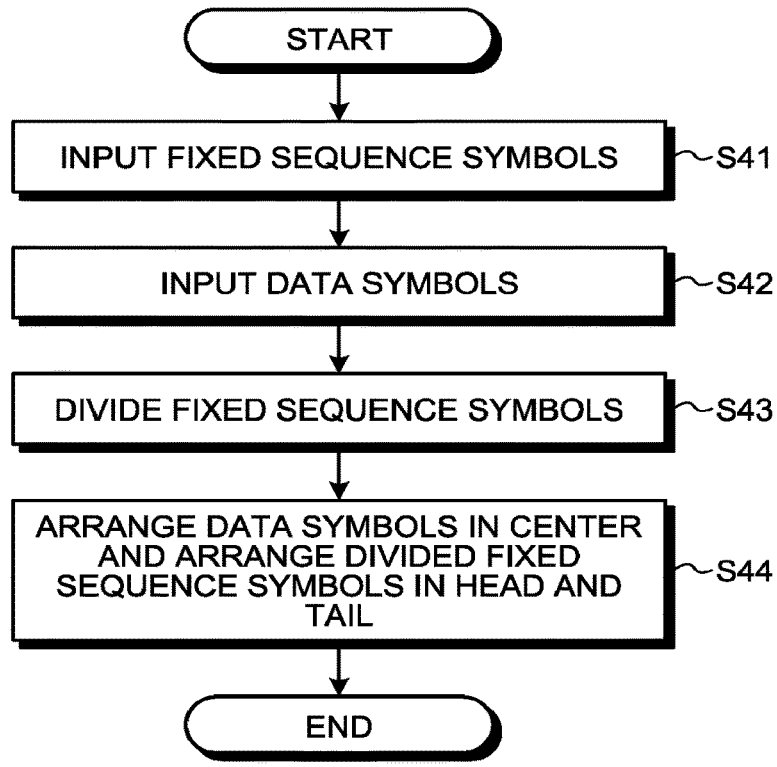
FIG. 6 is a flowchart showing the operation of a multiplexing unit of the transmission apparatus according to the first embodiment.

The multiplexing unit 13 is a pre-interpolation-data-block generating unit that multiplexes, in a time domain, the fixed sequence symbols inputted from the fixed-sequence generating unit 11 and the data symbols inputted from the data generating unit 12 to generate a pre-interpolation data block, and outputs the generated pre-interpolation data block to the DFT unit 14. The number of symbols of the pre-interpolation data block is set to $N_D$, the number of symbols of the fixed sequence symbols included in the pre-interpolation data block is set to M, and the number of symbols of the data symbols is set to $N_D$-M. The multiplexing unit 13 arranges the $N_D$-M data symbols in the center of the pre-interpolation data block. The multiplexing unit 13 divides the M fixed sequence symbols into halves, and for arrangement of the fixed sequence symbols in the pre-interpolation data block, arranges M/2 symbols in the latter half of the fixed sequence symbols in a head part of the pre-interpolation data block before the $N_D$-M data symbols arranged in the center of the pre-interpolation data block and arranges the remainder, M/2 symbols in the former half of the fixed sequence symbols in a tail part of the pre-interpolation data block behind the $N_D$-M data symbols. The M/2 symbols in the latter half of the fixed sequence symbols are a latter half part of the fixed sequence symbols. The M/2 symbols in the former half of the fixed sequence symbols are a former half part of the fixed sequence symbols. Note that, concerning the fixed sequence symbols placed in the pre-interpolation data block, the number of symbols may be different between the head part and the tail part. For example, the number of symbols of the fixed sequence symbols in the head part may be set to M', and the number of symbols of the fixed sequence symbols of the tail part may be set to M" to unbalance the arrangement. However, M=M'+M" and M'≠M" have to be satisfied. In the following explanation, for simplification of explanation, it is assumed that the number of symbols of the fixed sequence symbols arranged in the pre-interpolation data block is M/2 for both of the head part and the tail part. FIG. 6 is a flowchart showing the operation of the multiplexing unit 13 of the transmission apparatus 10 according to the first embodiment. Fixed sequence symbols are inputted to the multiplexing unit 13 from the fixed-sequence generating unit 11 (step S41). Data symbols are inputted to the multiplexing unit 13 from the data generating unit 12 (step S42). The multiplexing unit 13 divides the fixed sequence symbols (step S43), arranges the data symbols in the center of the pre-interpolation data block, arranges M/2 symbols in the latter half of the divided fixed sequence symbols in the head part of the pre-interpolation data block, and arranges M/2 symbols in the former half of the divided fixed sequence symbols in the tail part of the pre-interpolation data block (step S44).

Figure 7:
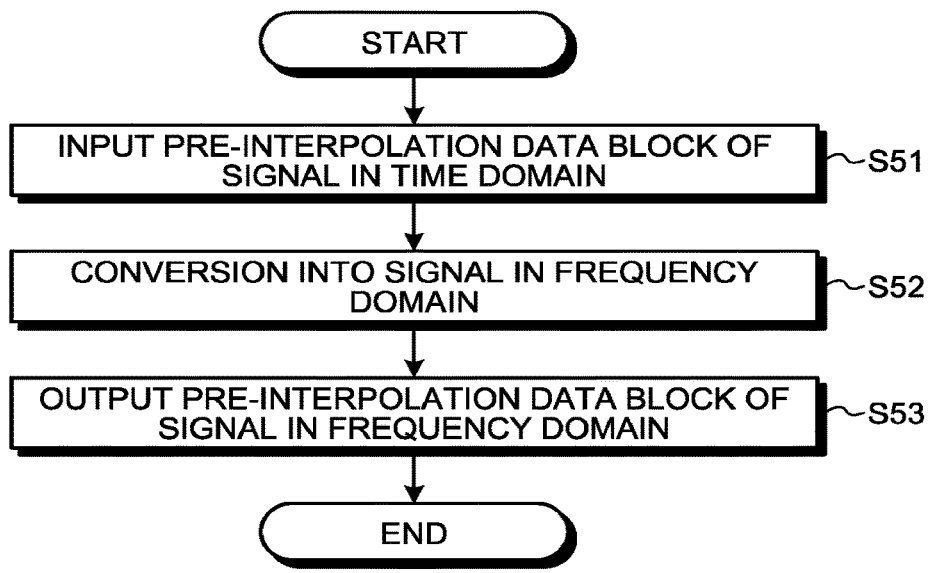
FIG. 7 is a flowchart showing the operation of a DFT unit of the transmission apparatus according to the first embodiment.

The DFT unit 14 is a Fourier transform unit that performs Fourier transform processing for converting the pre-interpolation data block formed of $N_D$ symbols inputted from the multiplexing unit 13 from a signal in a time domain into a signal in a frequency domain. The DFT unit 14 outputs the pre-interpolation data block that is the signal in the frequency domain after the conversion, to the interpolation processing unit 15. FIG. 7 is a flowchart showing the operation of the DFT unit 14 of the transmission apparatus 10 according to the first embodiment. When the pre-interpolation data block of the signal in the time domain is inputted from the multiplexing unit 13 (step S51), the DFT unit 14 performs the Fourier transform processing on the pre-interpolation data block of the signal in the time domain to convert the pre-interpolation data block from the signal in the time domain into the signal in the frequency domain (step S52), and outputs the pre-interpolation data block of the signal in the frequency domain (step S53).

Figure 8:
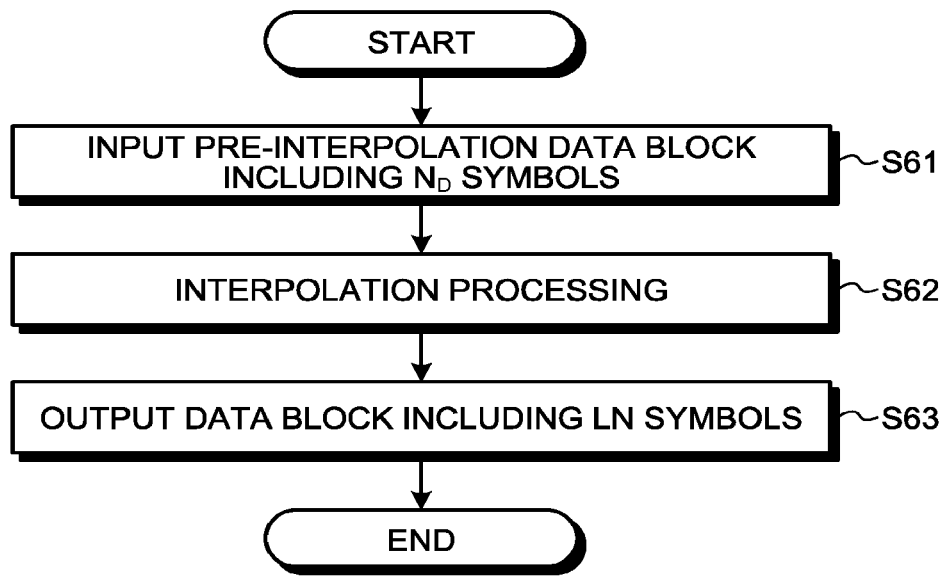
FIG. 8 is a flowchart showing the operation of an interpolation processing unit of the transmission apparatus according to the first embodiment.

The interpolation processing unit 15 sets an oversampling rate to L times, performs interpolation processing, for example, an oversampling process such as zero insertion in the frequency domain on the data block of the signal in the frequency domain, formed of the $N_D$ symbols inputted from the DFT unit 14, and generates and outputs a data block of a signal in the frequency domain, formed of LN symbols. When performing the zero insertion, the interpolation processing unit 15 inserts $LN-N_D$ zeros. FIG. 8 is a flowchart showing the operation of the interpolation processing unit 15 of the transmission apparatus 10 according to the first embodiment. When the pre-interpolation data block of the signal in the frequency domain, formed of the $N_D$ symbols is inputted (step S61), the interpolation processing unit 15 performs the interpolation processing on the pre-interpolation data block as a result of conversion into the signal in the frequency domain (step S62), and generates and outputs a data block of the signal in the frequency domain, formed of the LN symbols (step S63).

Figure 9:
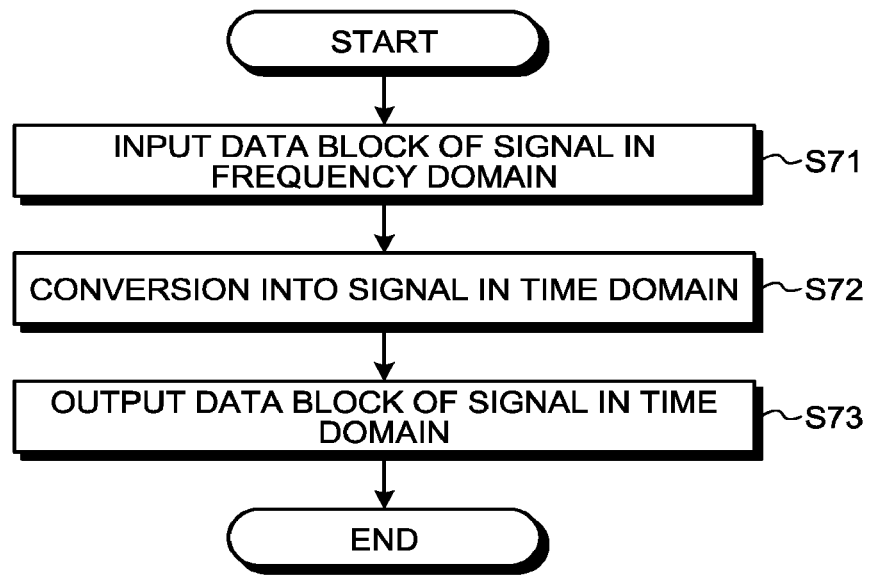
FIG. 9 is a flowchart showing the operation of an IDFT unit of the transmission apparatus according to the first embodiment.

The IDFT unit 16 is an inverse Fourier transform unit that performs inverse Fourier transform for converting the data block formed of the LN symbols inputted from the interpolation processing unit 15 into a signal in a time domain from a signal in a frequency domain. The IDFT unit 16 outputs the data block after the interpolation processing that is of the signal in the time domain after the conversion, and formed of the LN samples. FIG. 9 is a flowchart showing the operation of the IDFT unit 16 of the transmission apparatus 10 according to the first embodiment. When the data block of the signal in the frequency domain is inputted from the interpolation processing unit 15 (step S71), the IDFT unit 16 performs the inverse Fourier transform processing on the data block of the signal in the frequency domain to convert the data block from the signal in the frequency domain into a signal in a time domain (step S72), and outputs a data block of the signal in the time domain (step S73).

Figure 10:
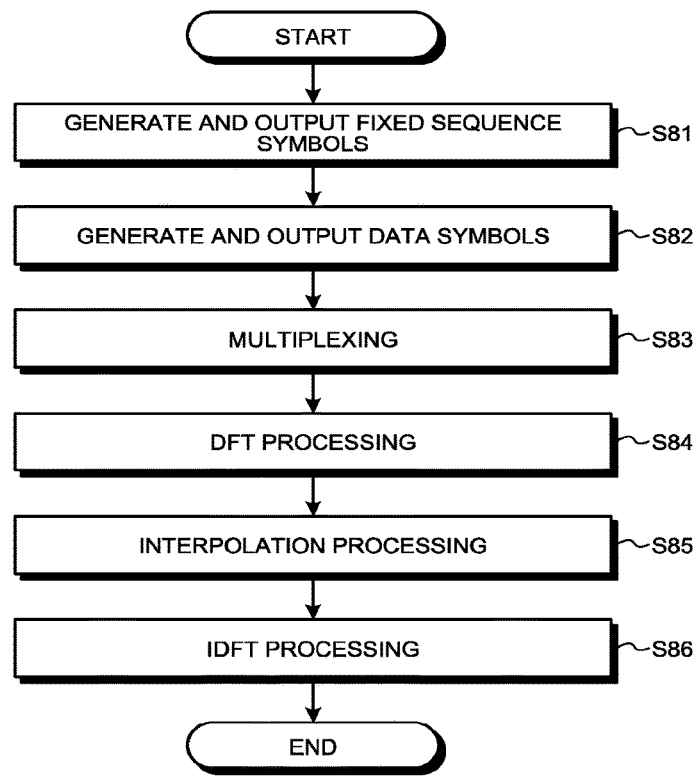
FIG. 10 is a flowchart showing an operation in which a data-block generating unit of the transmission apparatus according to the first embodiment generates and outputs a data block.

A basic flow of the processing of the data-block generating unit 1 is explained. FIG. 10 is a flowchart showing an operation in which the data-block generating unit 1 of the transmission apparatus 10 according to the first embodiment generates and outputs a data block. First, in the data-block generating unit 1, the fixed-sequence generating unit 11 generates and outputs fixed sequence symbols (step S81), and the data generating unit 12 generates and outputs data symbols (step S82). The multiplexing unit 13 multiplexes the fixed sequence symbols inputted from the fixed-sequence generating unit 11 and the data symbols inputted from the data generating unit 12 (step S83). In the data-block generating unit 1, the DFT unit 14 performs DFT processing for converting the pre-interpolation data block generated by the multiplexing into a signal in a frequency domain (step S84), the interpolation processing unit 15 performs the interpolation processing (step S85), and the IDFT unit 16 performs IDFT processing for converting the single in the frequency domain into a signal in a time domain (step S86). Note that detailed operations of the components are based on flowcharts of the components.

Figure 11:
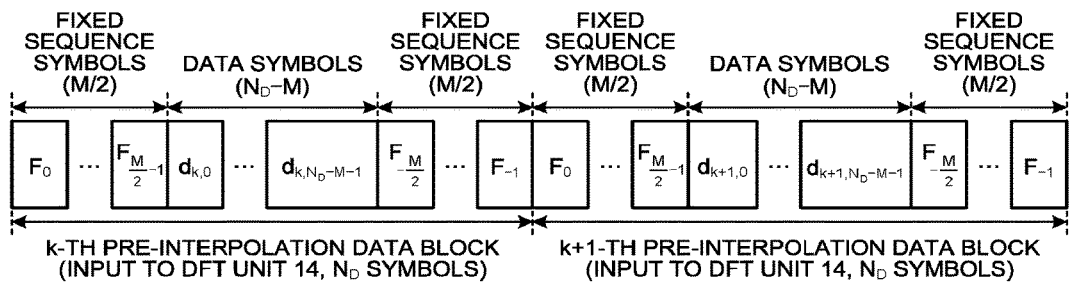
FIG. 11 is a diagram showing an example of the configuration of a pre-interpolation data block including data symbols, which is outputted from the multiplexing unit to the DFT unit of the transmission apparatus according to the first embodiment.

The configuration of the pre-interpolation data block outputted from the multiplexing unit 13 to the DFT unit 14 is explained. FIG. 11 is a diagram showing an example of the configuration of the pre-interpolation data block including the data symbols, which is outputted from the multiplexing unit 13 to the DFT unit 14 of the transmission apparatus 10 according to the first embodiment. In FIG. 11, as an example, there are shown a k-th pre-interpolation data block and a k+1-th pre-interpolation data block which are outputted from the multiplexing unit 13 to the DFT unit 14. Note that an m-th data symbol in the k-th pre-interpolation data block is represented as $d_{k,m}$. The k-th pre-interpolation data block includes $N_D$ symbols $F_0, \ldots, F_{M/2-1}, d_{k,0}, \ldots, d_{k,ND-M-1}, F_{-M/2}, \ldots,$ and $F_{-1}$ ($N_D$ is written as ND in the subscript) in the order of position from the head of the pre-interpolation data block. Similarly, the k+1-th pre-interpolation data block includes $N_D$ symbols $F_0, \ldots, F_{M/2-1}, d_{k+1,0}, \ldots, d_{k+1,ND-M-1}, F_{-M/2}, \ldots,$ and $F_{-1}$ ($N_D$ is written as ND in the subscript) in the order of position from the head of the pre-interpolation data block. In FIG. 11, a left side of the pre-interpolation data block is the head side, and a right side thereof is the tail side. The same applies to figures of blocks in the following description. As shown in FIG. 11, in each of the pre-interpolation data blocks, M/2 symbols in the latter half of the fixed sequence symbols are arranged in a head part of the pre-interpolation data block before the $N_D-M$ data symbols arranged in the center of the pre-interpolation data block, and M/2 symbols in the former half of the fixed sequence symbols are arranged in a tail part of the pre-interpolation data block behind the $N_D-M$ data symbols. As a result, the M/2 symbols $F_0, F_1, \ldots, F_{M/2-2},$ and $F_{M/2-1}$ in the latter half of the fixed sequence symbols arranged in the head part of the k+1-th pre-interpolation data block are connected sequentially with the M/2 symbols $F_{-M/2}, F_{-M/2+1}, \ldots,$ and $F_{-1}$ in the former half of the fixed sequence symbols arranged in the tail part of the immediately preceding k-th pre-interpolation data block. Consequently, in the data block subjected to the DFT processing by the DFT unit 14, the interpolation processing by the interpolation processing unit 15, and the IDFT processing by the IDFT unit 16, phases between the data blocks can link with each other and an out-of-band spectrum can be minimized.

Figure 12:
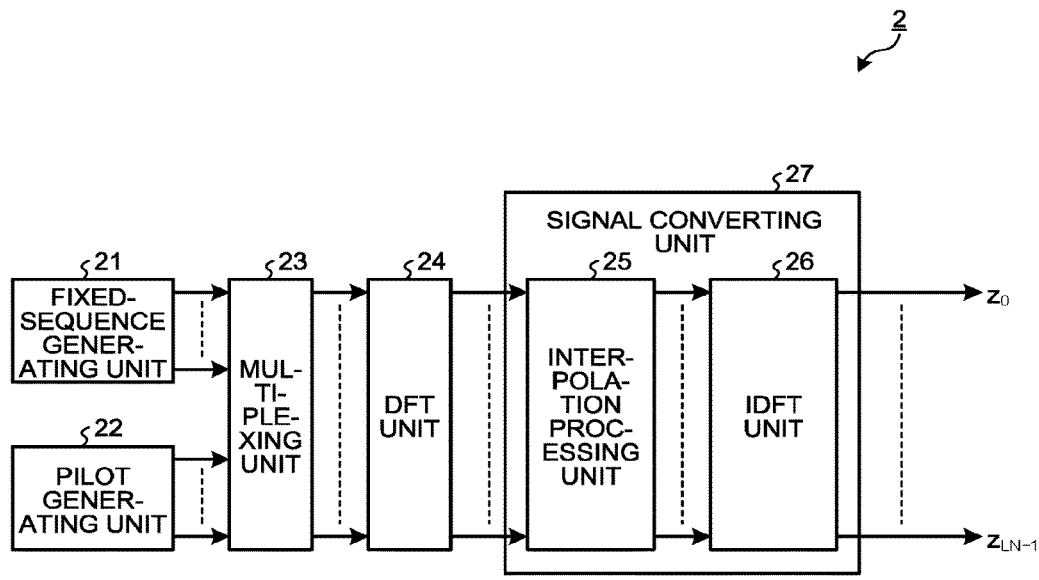
FIG. 12 is a block diagram showing a configuration example of a pilot-block generating unit of the transmission apparatus according to the first embodiment.

A detailed configuration of the pilot-block generating unit 2 is explained. FIG. 12 is a block diagram showing a configuration example of the pilot-block generating unit 2 of the transmission apparatus 10 according to the first embodiment. The pilot-block generating unit 2 includes a fixed-sequence generating unit 21, a pilot generating unit 22, a multiplexing unit 23, a DFT unit 24, an interpolation processing unit 25, and an IDFT unit 26. Herein, the interpolation processing unit 25 and the IDFT unit 26 constitute a signal converting unit 27.

The fixed-sequence generating unit 21 is a fixed-sequence-for-pilot-block generating unit that generates fixed sequence symbols to be inserted into a pre-interpolation pilot block and outputs the generated fixed sequence symbols to the multiplexing unit 23. The fixed sequence symbols correspond to the M symbols $F_{-M/2}, F_{-M/2+1}, \ldots, F_{-1}, F_0, F_1, \ldots, F_{M/2-2},$ and $F_{M/2-1}$ generated by the fixed-sequence generating unit 11. The pre-interpolation pilot block is a block generated by the multiplexing unit 23 before the interpolation processing of the interpolation processing unit 25 is applied, which is described later. Note that the pilot block is a block that is subjected to the interpolation processing by the interpolation processing unit 25 and outputted from the IDFT unit 26. A flowchart of the operation in the fixed-sequence generating unit 21 is equivalent to the flowchart of the fixed-sequence generating unit 11 shown in FIG. 4.

Figure 13:
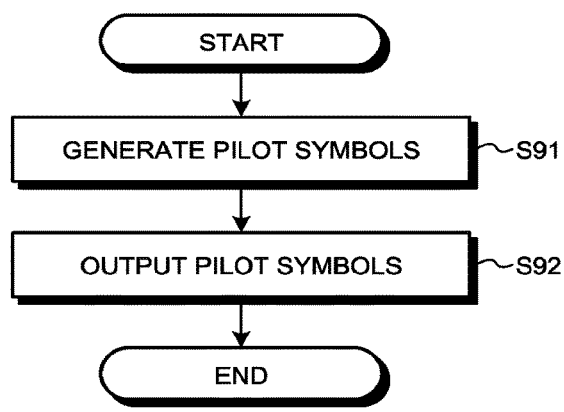
FIG. 13 is a flowchart showing the operation of a pilot generating unit of the transmission apparatus according to the first embodiment.

The pilot generating unit 22 is a pilot-for-pilot-block generating unit that generates pilot symbols that are fixed symbols already known in the receiving apparatus, and outputs the generated pilot symbols to the multiplexing unit 23. The pilot generating unit 22 generates $N_D$–M pilot symbols $p_0, \ldots,$ and $p_{N_D-M-1}$ ($N_D$ is written as ND in the subscript). FIG. 13 is a flowchart showing the operation of the pilot generating unit 22 of the transmission apparatus 10 according to the first embodiment. The pilot generating unit 22 generates pilot symbols (step S91), and then outputs the pilot symbols to the multiplexing unit 23 (step S92).

Figure 14:
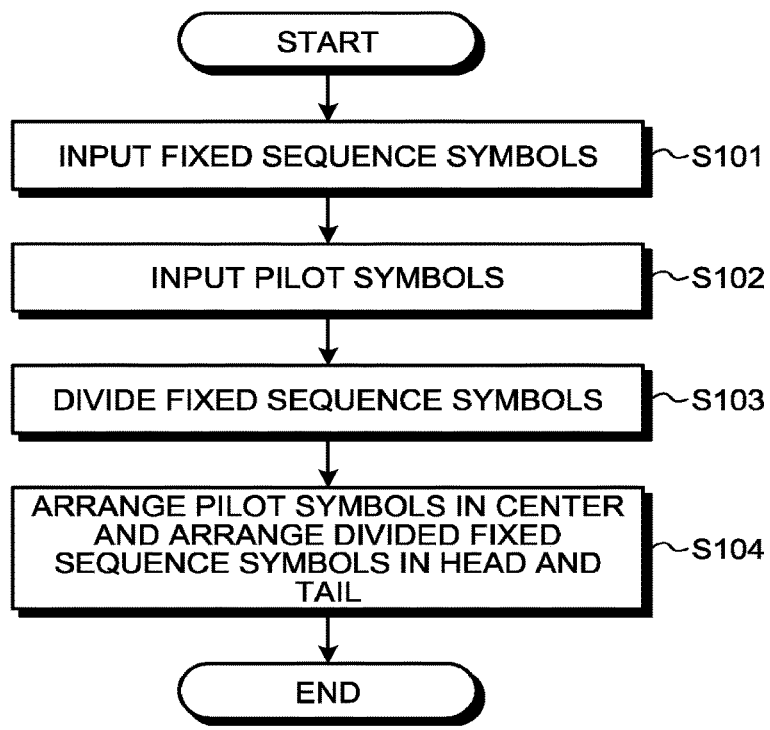
FIG. 14 is a flowchart showing the operation of a multiplexing unit of the transmission apparatus according to the first embodiment.

The multiplexing unit 23 is a pre-interpolation-pilot-block generating unit that multiplexes, in a time domain, the fixed sequence symbols inputted from the fixed-sequence generating unit 21 and the pilot symbols inputted from the pilot generating unit 22 to generate a pre-interpolation pilot block, and outputs the generated pre-interpolation pilot block to the DFT unit 24. Herein, the number of symbols of the pre-interpolation pilot block is set to $N_D$, the number of symbols of the fixed sequence symbols included in the pre-interpolation pilot block is set to M, and the number of symbols of the pilot symbols is set to $N_D$–M. The multiplexing unit 23 arranges the $N_D$–M pilot symbols in the center of the pre-interpolation pilot block. The multiplexing unit 23 divides the M fixed sequence symbols into halves, and for arrangement of the fixed sequence symbols in the pre-interpolation pilot block, arranges M/2 symbols in the latter half of the fixed sequence symbols in a head part of the pre-interpolation pilot block before the $N_D$–M pilot symbols arranged in the center of the pre-interpolation pilot block, and arranges other M/2 symbols in the former half of the fixed sequence symbols in a tail part of the pre-interpolation pilot block behind the $N_D$–M pilot symbols. The M/2 symbols in the latter half of the fixed sequence symbols are a latter half part of the fixed sequence symbols, while the M/2 symbols in the former half of the fixed sequence symbols are a former half part of the fixed sequence symbols. Note that, concerning the fixed sequence symbols arranged in the pre-interpolation pilot block, the number of symbols may be different between the head part and the tail part. For example, the number of symbols of the fixed sequence symbols in the head part may be set to M' and the number of symbols of the fixed sequence symbols of the tail part may be set to M" to unbalance the arrangement. However, M=M'+M" and M'≠M" have to be satisfied. In the following explanation, for simplification of explanation, it is assumed that the number of symbols of the fixed sequence symbols arranged in the pre-interpolation data block is M/2 for both of the head part and the tail part. FIG. 14 is a flowchart showing the operation of the multiplexing unit 23 of the transmission apparatus 10 according to the first embodiment. Fixed sequence symbols are inputted to the multiplexing unit 23 from the fixed-sequence generating unit 21 (step S101), while pilot symbols are inputted to the multiplexing unit 23 from the pilot generating unit 22 (step S102). The multiplexing unit 23 divides the fixed sequence symbols (step S103), arranges the pilot symbols in the center of the pre-interpolation pilot block, arranges M/2 symbols in the latter half of the divided fixed sequence symbols in the head part of the pre-interpolation pilot block, and arranges M/2 symbols in the former half of the divided fixed sequence symbols in the tail part of the pre-interpolation pilot block (step S104).

Figure 15:
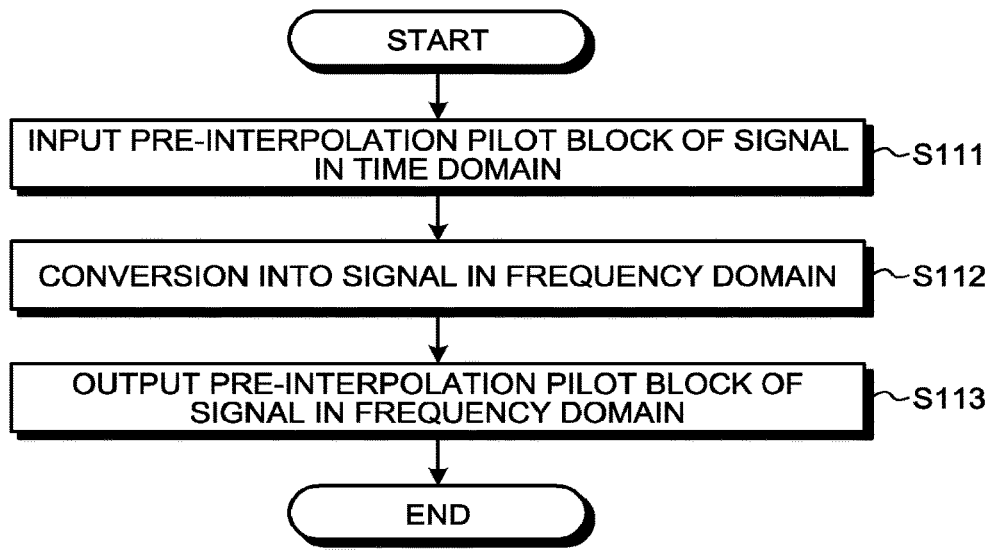
FIG. 15 is a flowchart showing the operation of the DFT unit of the transmission apparatus according to the first embodiment.

The DFT unit 24 is a Fourier transform unit that performs Fourier transform processing for converting the pre-interpolation pilot block formed of the $N_D$ symbols inputted from the multiplexing unit 23 from a signal in a time domain into a signal in a frequency domain. The DFT unit 24 outputs the pre-interpolation pilot block that is the signal in the frequency domain after the conversion, to the interpolation processing unit 25. FIG. 15 is a flowchart showing the operation of the DFT unit 24 of the transmission apparatus 10 according to the first embodiment. After the pre-interpolation pilot block of the signal in the time domain is inputted from the multiplexing unit 23 (step S111), the DFT unit 24 performs the Fourier transform processing on the pre-interpolation pilot block of the signal in the time domain to convert the pre-interpolation pilot block from the signal in the time domain into a signal in a frequency domain (step S112), and outputs the pre-interpolation pilot block of the signal in the frequency domain (step S113).

Figure 16:
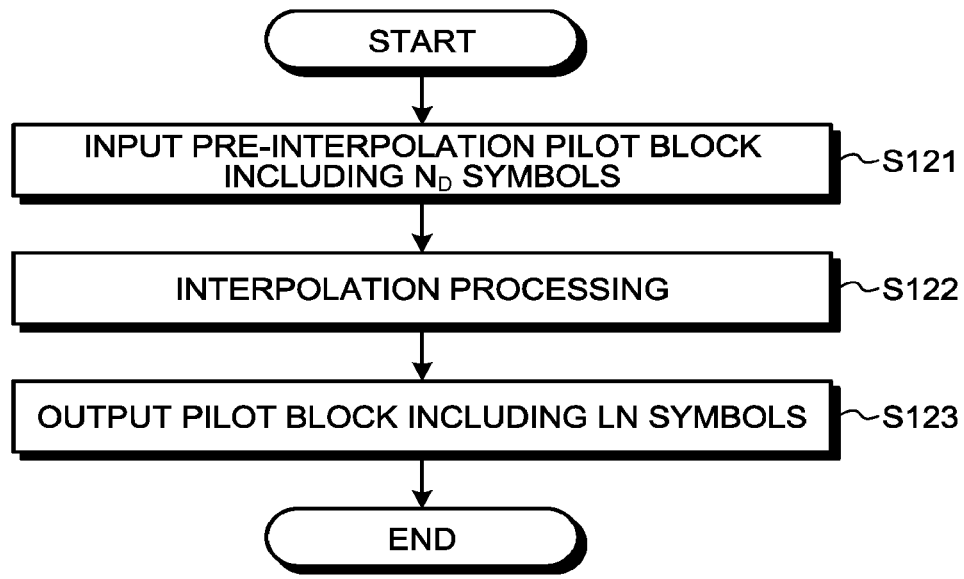
FIG. 16 is a flowchart showing the operation of the interpolation processing unit of the transmission apparatus according to the first embodiment.

The interpolation processing unit 25 sets an oversampling rate to L times, performs interpolation processing, for example, an oversampling process such as zero insertion in the frequency domain on the pre-interpolation pilot block of the signal in the frequency domain, formed of the $N_D$ symbols inputted from the DFT unit 24, and generates and outputs a pilot block of a signal in the frequency domain, formed of LN symbols. When performing the zero insertion, the interpolation processing unit 25 inserts LN–$N_D$ zeros. FIG. 16 is a flowchart showing the operation of the interpolation processing unit 25 of the transmission apparatus 10 according to the first embodiment. After the pre-interpolation pilot block of the signal in the frequency domain, formed of the $N_D$ symbols is inputted (step S121), the interpolation processing unit 25 performs the interpolation processing on the pre-interpolation pilot block obtained by the conversion into the signal in the frequency domain (step S122), and generates and outputs a pilot block of the signal in the frequency domain, formed of the LN symbols (step S123).

Figure 17:
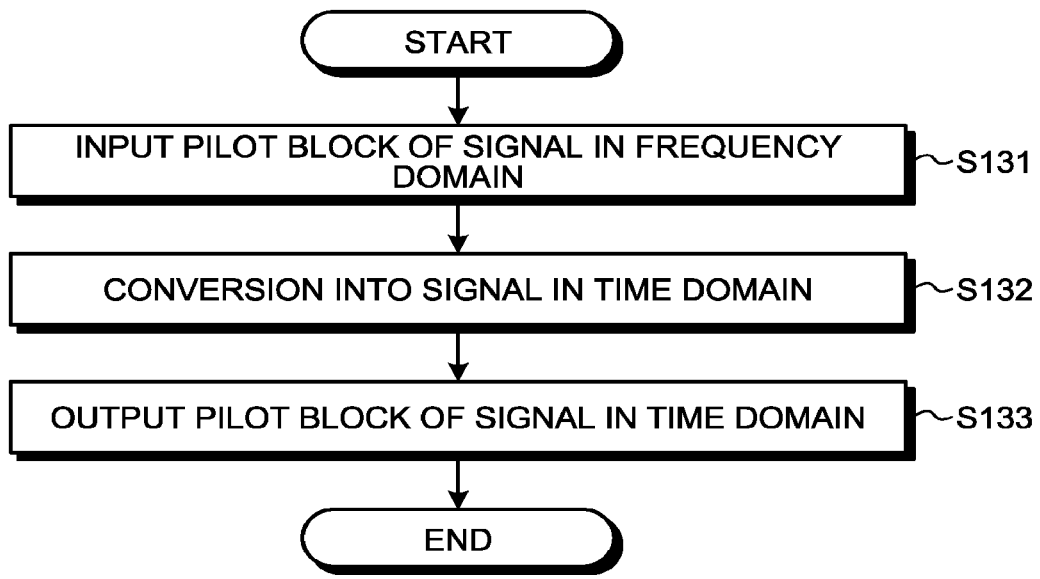
FIG. 17 is a flowchart showing the operation of the IDFT unit of the transmission apparatus according to the first embodiment.

The IDFT unit 26 is an inverse Fourier transform unit that performs inverse Fourier transform for converting the pilot block formed of the LN symbols inputted from the interpolation processing unit 25 from a signal in a frequency domain into a signal in a time domain. The IDFT unit 26 outputs the pilot block after the interpolation processing, formed of the LN samples, which is of the signal in the time domain after the conversion. FIG. 17 is a flowchart showing the operation of the IDFT unit 26 of the transmission apparatus 10 according to the first embodiment. After the pilot block of the signal in the frequency domain is inputted from the interpolation processing unit 25 (step S131), the IDFT unit 26 performs the inverse Fourier transform processing on the pilot block of the signal in the frequency domain to convert the signal in the frequency domain into a signal in a time domain (step S132), and outputs a pilot block of the signal in the time domain (step S133).

Figure 18:
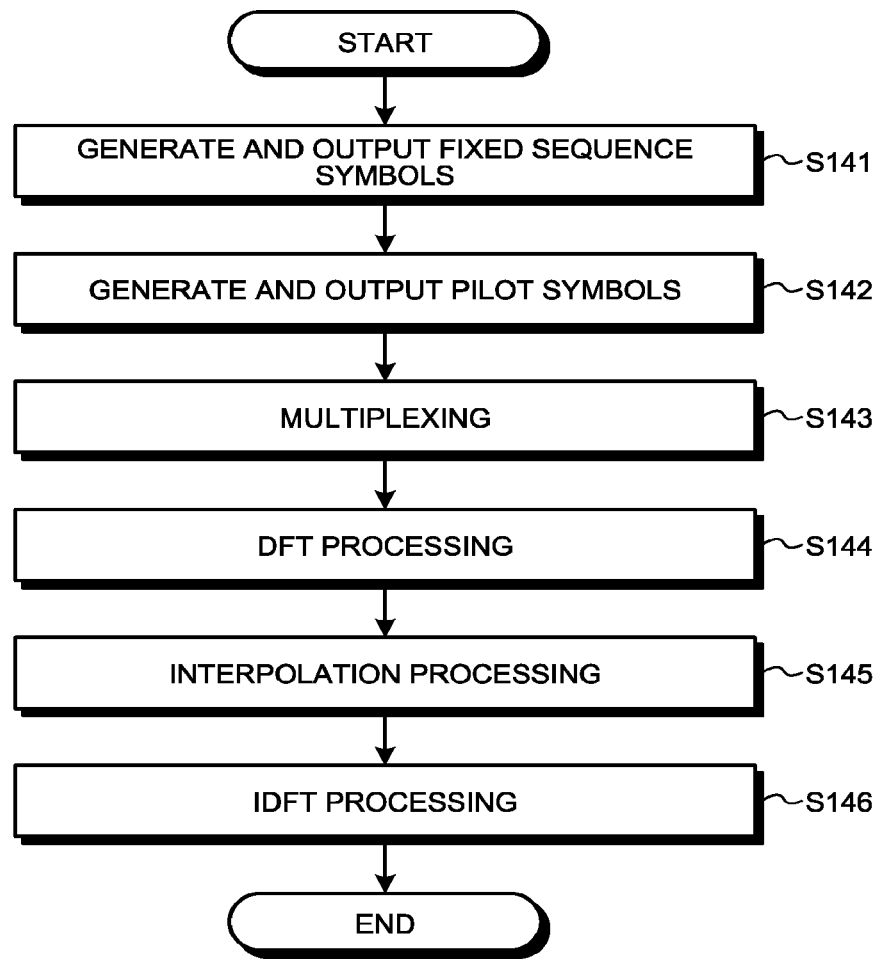
FIG. 18 is a flowchart showing an operation in which the pilot-block generating unit of the transmission apparatus according to the first embodiment generates and outputs a pilot block.

A basic flow of the processing of the pilot-block generating unit 2 is explained. FIG. 18 is a flowchart showing an operation in which the pilot-block generating unit 2 of the transmission apparatus 10 according to the first embodiment generates and outputs a pilot block. First, in the pilot-block generating unit 2, the fixed-sequence generating unit 21 generates and outputs fixed sequence symbols (step S141), and the pilot generating unit 22 generates and outputs pilot symbols (step S142). The multiplexing unit 23 multiplexes the fixed sequence symbols inputted from the fixed-sequence generating unit 21 and the pilot symbols inputted from the pilot generating unit 22 (step S143). In the pilot-block generating unit 2, the DFT unit 24 converts the pre-interpolation pilot block generated by the multiplexing into a signal in a frequency domain (step S144), the interpolation processing unit 25 performs the interpolation processing (step S145), and the IDFT unit 26 converts the pre-interpolation pilot block into a signal in a time domain (step S146). Note that detailed operations of the components are based on flowcharts of the components.

Figure 19:
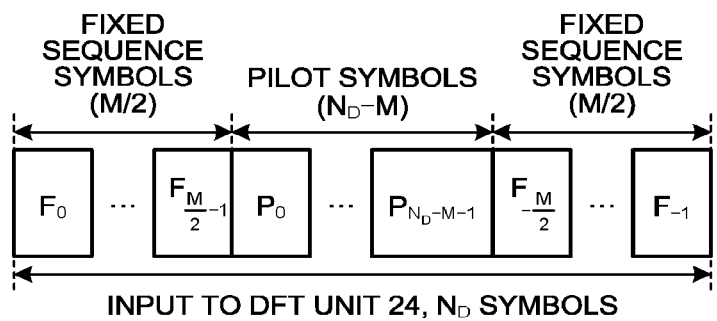
FIG. 19 is a diagram showing an example of the configuration of a pre-interpolation pilot block including pilot symbols, which is outputted from the multiplexing unit to the DFT unit of the transmission apparatus according to the first embodiment.

Now description is given for the configuration of the pre-interpolation pilot block outputted from the multiplexing unit 23 to the DFT unit 24. FIG. 19 is a diagram showing an example of the configuration of the pre-interpolation pilot block including the pilot symbols, which is outputted from the multiplexing unit 23 to the DFT unit 24 of the transmission apparatus 10 according to the first embodiment. In this configuration, relative to the pre-interpolation data block including data symbols shown in FIG. 11, the part for the data symbols is replaced with pilot symbols. Even if a pilot block including pilot symbols is adjacent to a data block including data symbols, arrangement of fixed sequence symbols is the same in the blocks. Therefore, as with the case of FIG. 11, in the pilot block subjected to the DFT processing by the DFT unit 24, the interpolation processing by the interpolation processing unit 25, and the IDFT processing by the IDFT unit 26, phases link between the pilot block and other blocks, for example, the data block, thereby eliminating phase discontinuity between the blocks. Consequently, in the transmission apparatus 10, it is possible to insert the pilot symbols into an SC block to be transmitted, while increase in an out-of-band spectrum is minimized.

Figure 20:
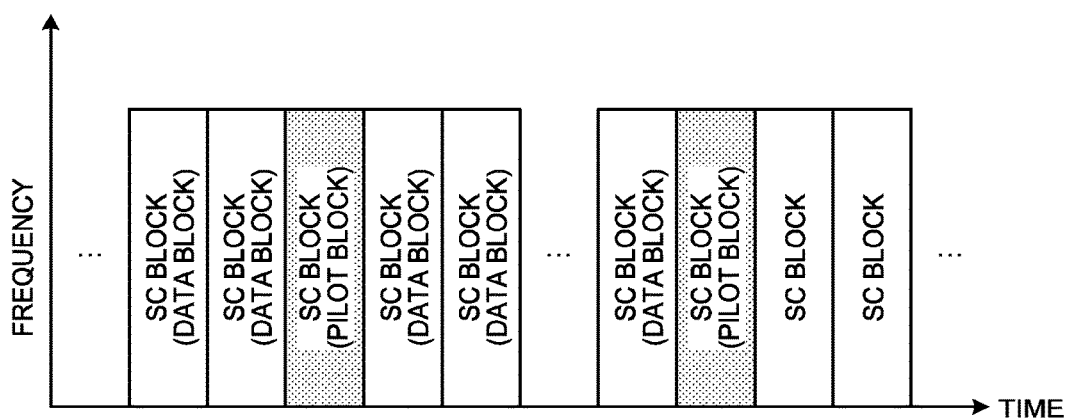
FIG. 20 is a chart showing SC blocks multiplexed in a time domain, which are outputted from the output control unit of the transmission apparatus according to the first embodiment.

FIG. 20 is a chart showing SC blocks multiplexed in a time domain, which are outputted from the output control unit 3 of the transmission apparatus 10 in the first embodiment. As shown in FIG. 1, a data block, that is, LN samples $y_0, \ldots,$ and $y_{LN-1}$ are inputted to the output control unit 3 from the data-block generating unit 1. A pilot block, that is, LN samples $z_0, \ldots,$ and $z_{LN-1}$ are inputted to the output control unit 3 from the pilot-block generating unit 2. While transmitting the data block, the transmission apparatus 10 periodically transmits the pilot block. A transmission frequency of the pilot block with respect to the data block is based on contents of control information outputted from the control unit 31 of the output control unit 3. Note that, in the transmission apparatus 10, the periodical transmission of the pilot block is an example, and the pilot block may be non-periodically transmitted. In this case, the control unit 31 of the output control unit 3 generates control information for non-periodically outputting the pilot block generated by the pilot-block generating unit 2, and outputs the control information to the output unit 32. The output control unit 3 periodically outputs the pilot block from the pilot-block generating unit 2.

A principle in which phase discontinuity between the data block and the pilot block is eliminated is explained. Concerning a k-th SC block transmitted from the output control unit 3, that is, the transmission apparatus 10, when the k-th SC block is a data block, an output signal of an n-th sample of the k-th SC block is represented as and when the k-th SC block is a pilot block, an output signal of an n-th sample of the k-th block is represented as $z_{k,n}$. In this case, an output signal of a sample of the SC block multiplexed in a time domain can be represented as expressed by (1) below. Note that $y_{,n+1}$ means an n+1-th sample of a data block that is the k-th SC block, $z_{k+1,1}$ means a first sample of the pilot block that is a k+1-th SC block, and $y_{k+2,1}$ means a first sample of a data block that is a k+2-th SC block.

$$\ldots, y_{k,n}, \ldots, y_{k,LN-1}, z_{k+1,0}, \ldots, z_{k+1,LN-1}, y_{k+2,0}, \ldots, y_{k+2,n}, \qquad (1)$$

This embodiment aims at allowing phases between SC blocks to smoothly link with each other. Specifically, in the above (1), phases are to be smoothly linked between $y_{k,LN-1}$ and $z_{k+1,0}$ and phases are smoothly linked between $z_{k+1,LN-1}$, $y_{k+2,0}$. As explained above, in this embodiment, the pilot-block generating unit 2 inserts fixed sequence symbols equal to the fixed sequence symbols inserted by the data-block generating unit 1 in a method same as the method of inserting the fixed sequence symbols into the pre-interpolation data block in the data-block generating unit 1, specifically, as shown in FIG. 19, in positions of M/2 symbols from the head of the pre-interpolation pilot block and positions of M/2 symbols from the tail of the same. The pilot-block generating unit 2 can smoothly link SC blocks by inserting fixed sequence symbols equal to the fixed sequence symbols generated by the data-block generating unit 1 into a place same as the pre-interpolation data block to generate a pre-interpolation pilot block.

Figure 21:
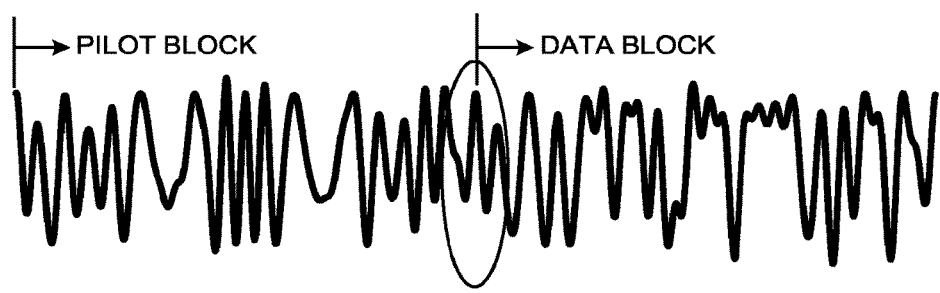
FIG. 21 is a chart showing an example of waveforms of a pilot block and a data block that are transmitted from the transmission apparatus according to the first embodiment.

FIG. 21 is a chart showing an example of waveforms of a pilot block and a data block that are transmitted from the transmission apparatus 10 according to the first embodiment. In FIG. 21, QPSK (Quadrature Phase Shift Keying) is assumed as an example of a modulation system of data symbols, and only a real number part of an output from the IDFT unit is shown. Specifically, the pilot block is outputted from the IDFT unit 26 of the pilot-block generating unit 2 through the output control unit 3. The data block is outputted from the IDFT unit 16 of the data-block generating unit 1 through the output control unit 3. In the transmission apparatus 10, concerning the pilot block and the data block, by inserting fixed sequence symbols in the same positions of the heads and the tails of SC blocks, it is possible to secure continuity of phases in the boundary between the pilot block and the data block.

Note that, in FIG. 19, a length of or the number of symbols of the pre-interpolation pilot block including the pilot symbols is set to $N_D$ that is the same as the pre-interpolation data block including the data symbols shown in FIG. 11, but $N_D$ is one example and does not necessarily limit the invention. For example, the length of the pre-interpolation pilot block including the pilot symbols may be set larger than the pre-interpolation data block including the data symbols, that is, the number of symbols may be set larger than $N_D$. Note that, even when the length of the pre-interpolation pilot block including the pilot symbols is set larger than the length of the pre-interpolation data block including the data symbols, it is desirable to fix the length of the fixed sequence, that is, the number of symbols to M in order to suppress an out-of-band spectrum.

Figure 22:
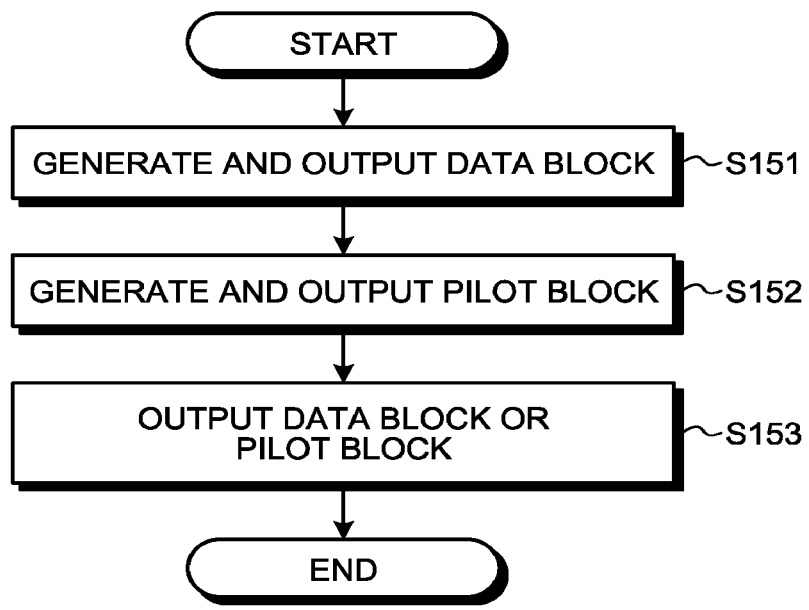
FIG. 22 is a flowchart showing an operation in which the transmission apparatus according to the first embodiment generates and outputs a data block and a pilot block.

A basic flow of the processing of the transmission apparatus 10 is explained. FIG. 22 is a flowchart showing an operation in which the transmission apparatus 10 according to the first embodiment generates and outputs a data block and a pilot block. First, in the transmission apparatus 10, the data-block generating unit 1 generates and outputs a data block (step S151) and the pilot-block generating unit 2 generates and outputs a pilot block (step S152). The output control unit 3 outputs the data block inputted from the data-block generating unit 1 or the pilot block inputted from the pilot-block generating unit 2 (step S153). Note that detailed operations of the components are based on flowcharts of the components.

In the pilot-block generating unit 2 shown in FIG. 12, because the pilot symbols and the fixed sequence symbols that are inputted to the DFT unit 24 from the multiplexing unit 23 are fixed, it is unnecessary to perform the DFT processing, the interpolation processing, and the IDFT processing for every block. For this reason, to reduce a computational amount and shorten a calculation time, the pilot block formed of the LN samples $z_0, \ldots,$ and $z_{LN-1}$ outputted from the IDFT unit 26 in FIG. 12 may be saved in a storing unit and used. Although not shown in a figure, for convenience of explanation, a transmission apparatus in this case is represented as a transmission apparatus 10' and a pilot-block generating unit in this case is represented as a pilot-block generating unit 2'. Note that, in the transmission apparatus 10', the configuration of the data-block generating unit 1 is the same as shown in FIG. 1.

Figure 23:
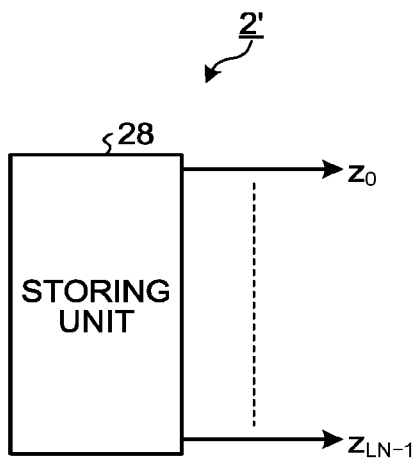
FIG. 23 is a block diagram showing a configuration example of the pilot-block generating unit of the transmission apparatus according to the first embodiment.

FIG. 23 is a block diagram showing a configuration example of the pilot-block generating unit 2' of the transmission apparatus 10' according to the first embodiment. The pilot-block generating unit 2' includes a storing unit 28. The storing unit 28 stores a pilot block of LN samples $z_0, \ldots,$ and $z_{LN-1}$ equal to the pilot block including the LN samples $z_0, \ldots,$ and $z_{LN-1}$ obtained by multiplexing, in the multiplexing unit 23, the fixed sequence generated by the fixed-sequence generating unit 21 and the pilot symbols generated by the pilot generating unit 22, applying, in the DFT unit 24, the DFT processing to the pre-interpolation pilot block formed of the $N_D$ symbols after the multiplexing shown in FIG. 19, performing the interpolation processing in the interpolation processing unit 25, and performing the IDFT processing in the IDFT unit 26, in the pilot-block generating unit 2 shown in FIG. 12. The storing unit 28 outputs the pilot block formed of the LN samples according to readout from the output control unit 3.

Also in the configuration of the pilot-block generating unit 2' shown in FIG. 23, it is possible to obtain an effect same as the effect of the pilot-block generating unit 2 shown in FIG. 12.

Figure 24:
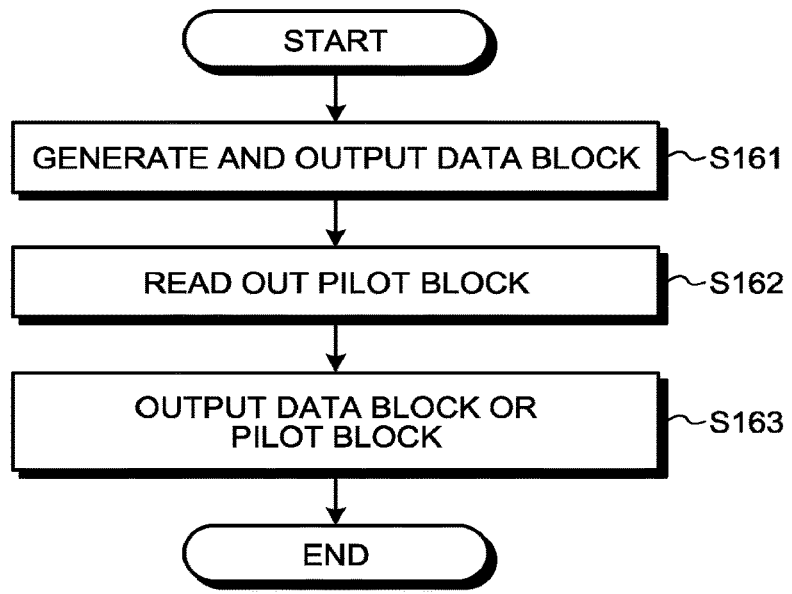
FIG. 24 is a flowchart showing an operation in which the transmission apparatus according to the first embodiment generates and outputs a data block and a pilot block.

A basic flow of the processing of the transmission apparatus 10' when the pilot-block generating unit 2' includes the storing unit 28 is explained. FIG. 24 is a flowchart showing operation in which the transmission apparatus 10' according to the first embodiment generates and outputs a data block and a pilot block. First, in the transmission apparatus 10', the data-block generating unit 1 generates and outputs a data block (step S161), and the output control unit 3 reads out a pilot block stored in the pilot-block generating unit 2' (step S162). The output control unit 3 outputs the data block inputted from the data-block generating unit 1 or the pilot block stored in the pilot-block generating unit 2' (step S163). Note that the operation explained above is one example, and the present invention is not limited to this example. For example, when the output control unit 3 outputs the pilot block without reading out the pilot block from the pilot-block generating unit 2' beforehand, the output control unit 3 may read out the pilot block stored in the pilot-block generating unit 2' from the pilot-block generating unit 2' and output the pilot block. Detailed operations of the components are based on flowcharts of the components.

Next, a hardware configuration of the transmission apparatus 10 is explained. In the transmission apparatus 10, the data generating unit 12 of the data-block generating unit 1 is realized by a modulator, the DFT unit 14 of the data-block generating unit 1 and the DFT unit 24 of the pilot-block generating unit 2 are realized by DFT circuits, the interpolation processing unit 15 of the data-block generating unit 1 and the interpolation processing unit 25 of the pilot-block generating unit 2 are realized by interpolation circuits, and the IDFT unit 16 of the data-block generating unit 1 and the IDFT unit 26 of the pilot-block generating unit 2 are realized by IDFT circuits. Note that, when the pilot-block generating unit 2' is constructed by the storing unit 28, the storing unit 28 is realized by a memory. Therefore, in the following explanation, among the components of the transmission apparatus 10 shown in FIGS. 1 and 12, parts for the fixed-sequence generating units 11 and 21, the pilot generating unit 22, the multiplexing units 13 and 23, and the output control unit 3 are explained.

Figure 25:
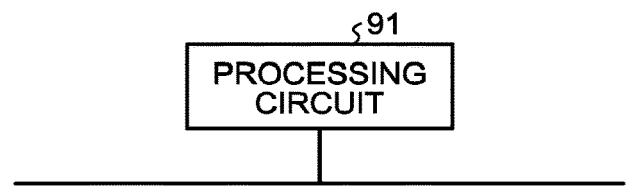
FIG. 25 is a diagram showing an example of a hardware configuration of the transmission apparatus according to the first embodiment.
Figure 26:
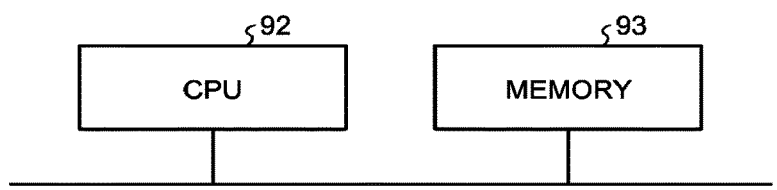
FIG. 26 is a diagram showing an example of a hardware configuration of the transmission apparatus according to the first embodiment.

FIGS. 25 and 26 are diagrams showing an example of the hardware configuration of the transmission apparatus 10 according to the first embodiment. In the transmission apparatus 10, functions of the fixed-sequence generating units 11 and 21, the pilot generating unit 22, the multiplexing units 13 and 23, and the output control unit 3 are realized by a processing circuit 91. That is, the transmission apparatus 10 includes a processing device for generating fixed sequence symbols, generating pilot symbols, multiplexing a plurality of kinds of symbols, and outputting one block of two blocks. The processing circuit 91 may be dedicated hardware or may be a CPU (Central Processing Unit) 92 that executes a program stored in a memory 93 and the memory 93. The CPU 92 may be a central processing device, a processing device, an arithmetic operation device, a microprocessor, a microcomputer, a processor, a DSP (Digital Signal Processor), or the like.

When the processing circuit 91 is dedicated hardware, the processing circuit 91 is realized by a single circuit, a composite circuit, a programmed processor, a parallel-programmed processor, an ASIC (Application Specific Integrated Circuit), an FPGA (Field Programmable Gate Array), or a combination of the foregoing, for example. Each of functions of the fixed-sequence generating units 11 and 21, the pilot generating unit 22, the multiplexing units 13 and 23, and the output control unit 3 may be realized by the processing circuit 91 or the functions of the units may be realized collectively by the processing circuit 91.

When the processing circuit 91 is the CPU 92 and the memory 93, the functions of the fixed-sequence generating units 11 and 21, the pilot generating unit 22, the multiplexing units 13 and 23, and the output control unit 3 are realized by software, firmware, or a combination of software and firmware. The software or firmware is described as a program and stored in the memory 93. In the processing circuit 91, the CPU 92 reads out and executes the program stored in the memory 93 to thereby realize the functions of the units. That is, the transmission apparatus 10 includes the memory 93 for storing a program for resultantly executing, when execution thereof is realized by the processing circuit 91, a step of generating fixed sequence symbols, a step of generating pilot symbols, a step of multiplexing a plurality of kinds of symbols, and a step of outputting one block of two blocks. These programs are also considered to be programs for causing a computer to execute procedures and methods for the fixed-sequence generating units 11 and 21, the pilot generating unit 22, the multiplexing units 13 and 23, and the output control unit 3. For example, the memory 93 is realized by a nonvolatile or volatile semiconductor memory such a RAM (Random Access Memory), a ROM (Read Only Memory), a flash memory, an EPROM (Erasable Programmable ROM), or an EEPROM (Electrically EPROM), a magnetic disk, a flexible disk, an optical disk, a compact disk, a mini disk, or a DVD (Digital Versatile Disc).

Note that, concerning the functions of the fixed-sequence generating units 11 and 21, the pilot generating unit 22, the multiplexing units 13 and 23, and the output control unit 3, a part of the functions may be realized by hardware and another part of the functions may be realized by software or hardware. For example, concerning the fixed-sequence generating units 11 and 21, the pilot generating unit 22, and the multiplexing units 13 and 23, their functions can be realized by the processing circuit 91 functioning as dedicated hardware. Concerning the output control unit 3, its function can be realized by the CPU 92 reading out and executing the program stored in the memory 93 in the processing circuit 91.

In this way, the processing circuit 91 can realize the aforementioned functions with hardware, software, firmware, or a combination of them. Note that the fixed-sequence generating units 11 and 21 and the pilot generating unit 22 are not limited to the configurations explained above, and as with the data generating unit 12, the units 11 and 21 may be configured based on a modulator.

As explained above, according to this embodiment, when the transmission apparatuses 10 and 10' generate SC blocks of a data block including data symbols and a pilot block including pilot symbols, the transmission apparatuses 10 and 10' insert fixed sequence symbols in a position same as the position of the pre-interpolation data block including the data symbols and the pre-interpolation pilot block including the pilot symbols in the pre-interpolation SC blocks before the DFT processing, the interpolation processing, and the IDFT processing. Consequently, in the transmission apparatuses 10 and 10', even when pilot symbols are inserted into a signal to be transmitted, discontinuity of phases between SC blocks is eliminated, thereby making it possible to minimize an increase in an out-of-band spectrum.

Second Embodiment

In the first embodiment, the transmission apparatus 10 performs time-multiplexing of the data block and the pilot block and outputs the blocks while securing the phase continuity between the SC blocks. In this embodiment, a method is explained in which a transmission apparatus performs time-multiplexing of multiplexed blocks that are SC blocks obtained by subjecting data symbols and pilot symbols to frequency-multiplexing, with respect to a data block and outputs the multiplexed blocks while securing phase continuity between the SC blocks. Note that, in this embodiment, it is not assumed that frequency-multiplexing of data symbols and pilot symbols is performed in all the SC blocks. The same applies to embodiments explained below.

In the second embodiment, it is assumed that the configuration of the transmission apparatus 10 is the same as in the first embodiment shown in FIG. 1. However, in the second embodiment, the pilot-block generating unit 2 is replaced with a pilot-block generating unit 2a. The pilot-block generating unit 2a generates and outputs a multiplexed block that is a type of a pilot block including pilot symbols and is an SC block obtained by multiplexing pilot symbols and data symbols in a frequency band. Although not shown in the figure, for convenience of explanation, the transmission apparatus in the second embodiment is represented as a transmission apparatus 10a.

Figure 27:
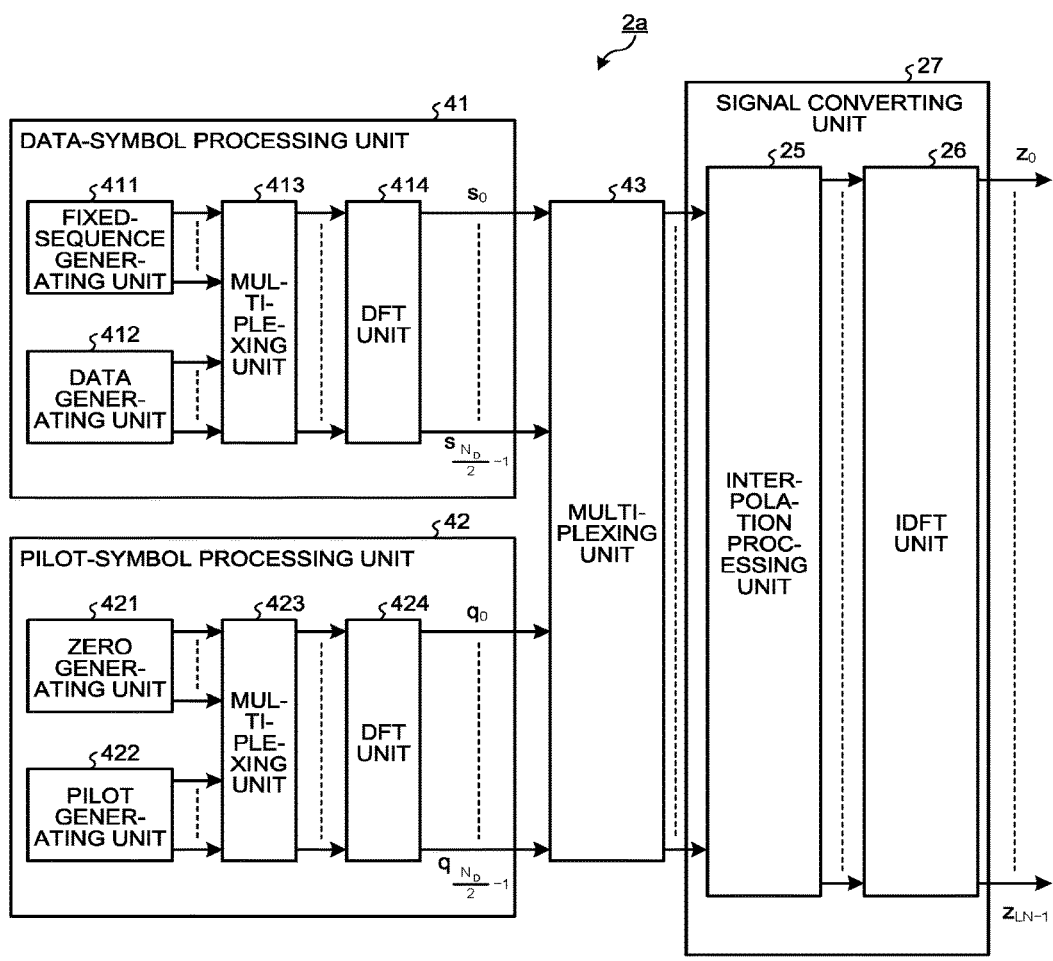
FIG. 27 is a block diagram showing a configuration example of a pilot-block generating unit of a transmission apparatus according to a second embodiment.

FIG. 27 is a block diagram showing a configuration example of the pilot-block generating unit 2a of the transmission apparatus 10a according to the second embodiment. The pilot-block generating unit 2a includes a data-symbol processing unit 41, a pilot-symbol processing unit 42, a multiplexing unit 43, the interpolation processing unit 25, and the IDFT unit 26. The interpolation processing unit 25 and the IDFT unit 26 constitute the signal converting unit 27.

The data-symbol processing unit 41 generates a first multiplexed symbol including data symbols, performs Fourier transform processing on the first multiplexed symbol, converts the first multiplexed symbol from a signal in a time domain into a signal in a frequency domain, and outputs the signal in a frequency domain to the multiplexing unit 43. The data-symbol processing unit 41 includes a fixed-sequence generating unit 411, a data generating unit 412, a multiplexing unit 413, and a DFT unit 414.

As with the fixed-sequence generating unit 11 in the first embodiment, the fixed-sequence generating unit 411 is a fixed-sequence-for-first-multiplexed-symbol generating unit that generates fixed sequence symbols including M symbols $F_{-M/2}, F_{-M/2+1}, \ldots, F_{-1}, F_0, F_1, \ldots, F_{M/2-2}$, and $F_{M/2-1}$. The fixed-sequence generating unit 411 outputs the generated fixed sequence symbols to the multiplexing unit 413. A flowchart of an operation in the fixed-sequence generating unit 411 is equivalent to the flowchart of the fixed-sequence generating unit 11 shown in FIG. 4.

As with the data generating unit 12 in the first embodiment, the data generating unit 412 is a data-for-first-multiplexed-symbol generating unit that generates data symbols compliant with a modulation system such as PSK or QAM, and outputs the generated data symbols to the multiplexing unit 413. Note that the PSK, the QAM, and the like are examples, ant the modulation system may be a modulation system different from the PSK and QAM. The modulation system is determined to correspond to the modulation system of the data generating unit 12. The data generating unit 12 generates data symbols having the number of symbols being $N_D$–M, as data symbols for one data block. The data generating unit 412 generates data symbols having the number of symbols being $N_D/2$–M, as data symbols for one multiplexed block. Although the number of symbols to be generated is different, a flowchart of an operation in the data generating unit 412 is the same as the flowchart of the data generating unit 12 shown in FIG. 5.

The multiplexing unit 413 is a first-multiplexed-symbol generating unit that multiplexes, in a time domain, the fixed sequence symbols inputted from the fixed-sequence generating unit 411 and the data symbols inputted from the data generating unit 412 to generate a first multiplexed symbol including the data symbols, and outputs the generated first multiplexed symbol to the DFT unit 414. Herein, the number of symbols of the first multiplexed symbol is set to $N_D/2$, the number of symbols of the fixed sequence symbols included in the first multiplexed symbol is set to M, and the number of symbols of the data symbols is set to $N_D/2$–M. The multiplexing unit 413 arranges $N_D/2$–M data symbols in the center of the first multiplexed symbol. The multiplexing unit 413 divides the M fixed sequence symbols into halves, and for arrangement of the fixed sequence symbols in the first multiplexed symbol, arranges M/2 symbols in the latter half of the fixed sequence symbols in a head part of the first multiplexed symbol before the $N_D/2$–M data symbols arranged in the center of the first multiplexed symbol, and arranges other M/2 symbols in the former half of the fixed sequence symbols in a tail part of the first multiplexed symbol behind the $N_D/2$–M data symbols. The M/2 symbols in the latter half of the fixed sequence symbols are a latter half part of the fixed sequence symbols, while the M/2 symbols in the former half of the fixed sequence symbols are a former half part of the fixed sequence symbols. Note that, concerning the fixed sequence symbols arranged in the first multiplexed symbol, the number of symbols may be different between the head part and the tail part. For example, the number of symbols of the fixed sequence symbols in the head part may be set to M', and the number of symbols of the fixed sequence symbols of the tail part may be set to M" to unbalance the arrangement. However, M=M'+M" and M'≠M" have to be satisfied. In the following explanation, for simplification of explanation, it is contemplated that the number of symbols of the fixed sequence symbols arranged in the first multiplexed symbol is M/2 for both of the head part and the tail part. Although the number of symbols of data symbols to be treated and a name of a signal after multiplexing are different, a flowchart of an operation in the multiplexing unit 413 is equivalent to the flowchart of the multiplexing unit 13 shown in FIG. 6.

Figure 28:
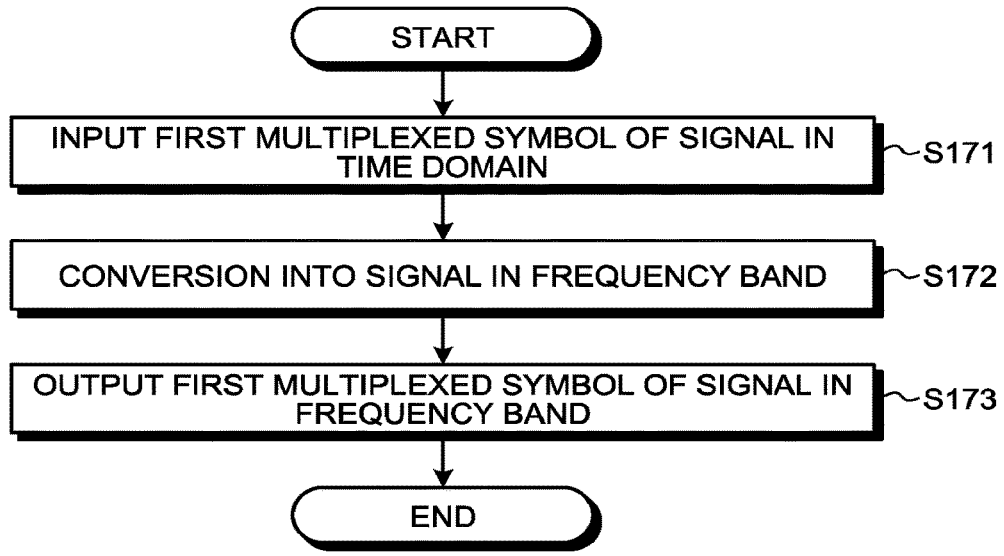
FIG. 28 is a flowchart showing the operation of a DFT unit of the transmission apparatus according to the second embodiment.

The DFT unit 414 is a Fourier transform unit that performs Fourier transform processing for converting the first multiplexed symbol including the $N_D/2$ symbols inputted from the multiplexing unit 413 from a signal in a time domain into a signal in a frequency domain. The DFT unit 414 outputs the first multiplexed symbol that is the signal in the frequency domain after the conversion, to the multiplexing unit 43. FIG. 28 is a flowchart showing the operation of the DFT unit 414 of the transmission apparatus 10a according to the second embodiment. When the first multiplexed symbol of the signal in the time domain is inputted from the multiplexing unit 413 (step S171), the DFT unit 414 performs the Fourier transform processing on the first multiplexed symbol of the signal in the time domain to convert the first multiplexed symbol from the signal in the time domain into a signal in a frequency domain (step S172), and outputs the first multiplexed symbol of the signal in the frequency domain (step S173).

Figure 29:
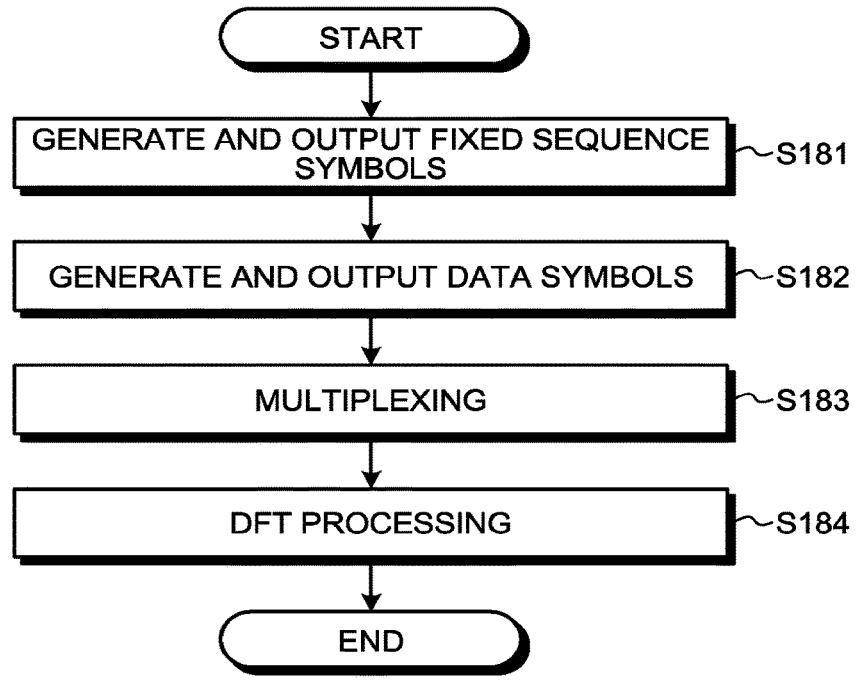
FIG. 29 is a flowchart showing the operation of a data-symbol processing unit of the transmission apparatus according to the second embodiment.

FIG. 29 is a flowchart showing the operation of the data-symbol processing unit 41 of the transmission apparatus 10a according to the second embodiment. In the data-symbol processing unit 41, the fixed-sequence generating unit 411 generates and outputs fixed sequence symbols (step S181), and the data generating unit 412 generates and outputs data symbols (step S182). The multiplexing unit 413 multiplexes the fixed sequence symbols inputted from the fixed-sequence generating unit 411 and the data symbols inputted from the data generating unit 412 (step S183). Then, the DFT unit 414 performs DFT processing for converting a first multiplexed symbol generated by multiplexing into a signal in a frequency domain (step S184).

Figure 30:
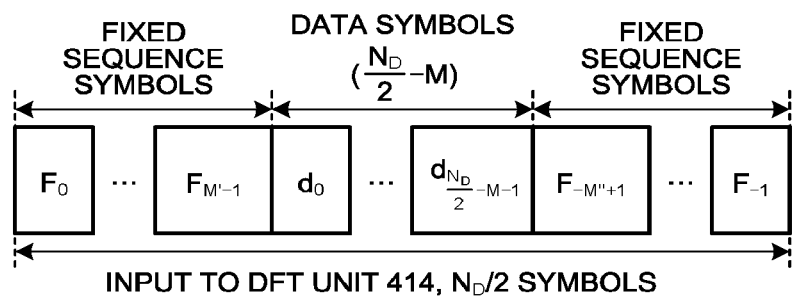
FIG. 30 is a diagram showing an example of the configuration of a first multiplexed symbol including data symbols, which is outputted from a multiplexing unit to the DFT unit of the transmission apparatus according to the second embodiment.

FIG. 30 is a diagram showing an example of the configuration of the first multiplexed symbol including the data symbols, which is outputted from the multiplexing unit 413 to the DFT unit 414 of the transmission apparatus 10a according to the second embodiment. Herein, an m-th data symbol in the first multiplexed symbol is represented as $d_m$. Compared with the configuration of the data block in the first embodiment shown in FIG. 11, the number of symbols of the data symbols is different, but arrangement of the fixed sequence symbols is the same.

The configuration of the pilot-symbol processing unit 42 is explained. The pilot-symbol processing unit 42 generates a second multiplexed symbol including pilot symbols, performs Fourier transform processing on the second multiplexed symbol, converts the second multiplexed symbol from a signal in a time domain into a signal in a frequency domain, and outputs the signal in a frequency domain to the multiplexing unit 43. The pilot-symbol processing unit 42 includes a zero generating unit 421, a pilot generating unit 422, a multiplexing unit 423, and a DFT unit 424.

Figure 31:
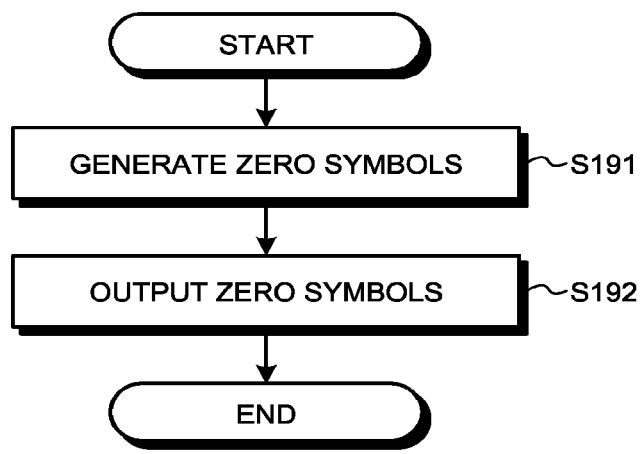
FIG. 31 is a flowchart showing the operation of a zero generating unit of the transmission apparatus according to the second embodiment.

The zero generating unit 421 is a zero-for-second-multiplexed-symbol generating unit that generates zero symbols that are symbols having signal values of zero values, and outputs the generated zero symbol to the multiplexing unit 423. The zero generating unit 421 generates M zero symbols having the same number of symbols as the fixed sequence symbols described previously. FIG. 31 is a flowchart showing the operation of the zero generating unit 421 of the transmission apparatus 10a according to the second embodiment. The zero generating unit 421 generates a zero symbol (step S191), and then outputs the zero symbol to the multiplexing unit 423 (step S192).

As with the pilot generating unit 22 in the first embodiment, the pilot generating unit 422 is a pilot-for-second-multiplexed-symbol generating unit that generates pilot symbols that are fixed symbols already known in a receiving apparatus, and outputs the generated pilot symbols to the multiplexing unit 423. The pilot generating unit 422 herein generates $N_D/2-M$ pilot symbols $p_0, \ldots,$ and $P_{ND/2-M-1}$ (ND is denoted as ND in the subscript). Although the number of symbols to be generated is different, a flowchart of an operation in the pilot generating unit 422 is equivalent to the flowchart of the pilot generating unit 22 shown in FIG. 13.

Figure 32:
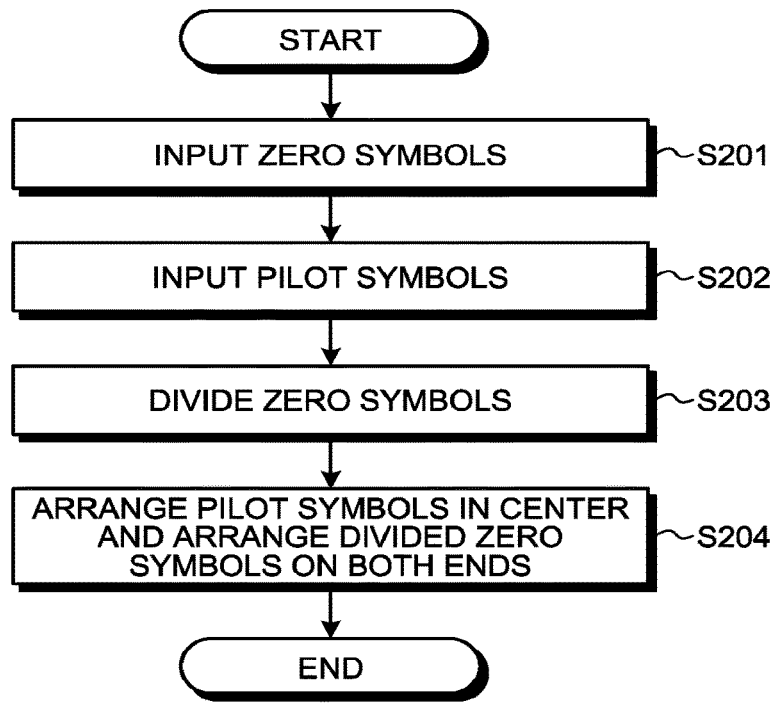
FIG. 32 is a flowchart showing the operation of the multiplexing unit of the transmission apparatus according to the second embodiment.

The multiplexing unit 423 is a second-multiplexed-symbol generating unit that multiplexes, in a time domain, the zero symbols inputted from the zero generating unit 421 and the pilot symbols inputted from the pilot generating unit 422 to generate a second multiplexed symbol including pilot symbols, and outputs the generated second multiplexed symbol to the DFT unit 424. Herein, the number of symbols of the second multiplexed symbol is set to $N_D/2$, the number of symbols of the zero symbols included in the second multiplexed symbol is set to M, and the number of symbols of the pilot symbols is set to $N_D/2-M$. The multiplexing unit 423 arranges the $N_D/2-M$ pilot symbols in the center of the second multiplexed symbol. The multiplexing unit 423 divides the M zero symbols into halves, and for arrangement of the zero symbols in the second multiplexed symbol, arranges M/2 zero symbols in a head part of the second multiplexed symbol before the $N_D/2-M$ pilot symbols arranged in the center of the second multiplexed symbol, and arranges M/2 zero symbols in a tail part of the second multiplexed symbol behind the $N_D/2-M$ pilot symbols. Note that, concerning the zero symbols arranged in the second multiplexed symbol, the number of samples may be different between the head part and the tail part. For example, the number of symbols of the zero symbols in the head part may be set to M' and the number of symbols of the zero symbols in the tail part may be set to M" to unbalance the arrangement. However, M=M'+M" and M'≠M" have to be satisfied. In the following explanation, for simplification of explanation, it is contemplated that the number of symbols of the zero symbols arranged in the second multiplexed symbol is M/2 for both of the head part and the tail part. FIG. 32 is a flowchart showing the operation of the multiplexing unit 423 of the transmission apparatus 10a according to the second embodiment. Zero symbols are inputted to the multiplexing unit 423 from the zero generating unit 421 (step S201). Pilot symbols are inputted to the multiplexing unit 423 from the pilot generating unit 422 (step S202). The multiplexing unit 423 divides the zero symbols (step S203), arranges the pilot symbols in the center, arranges the divided zero symbols on both ends of the pilot symbols (step S204).

Figure 33:
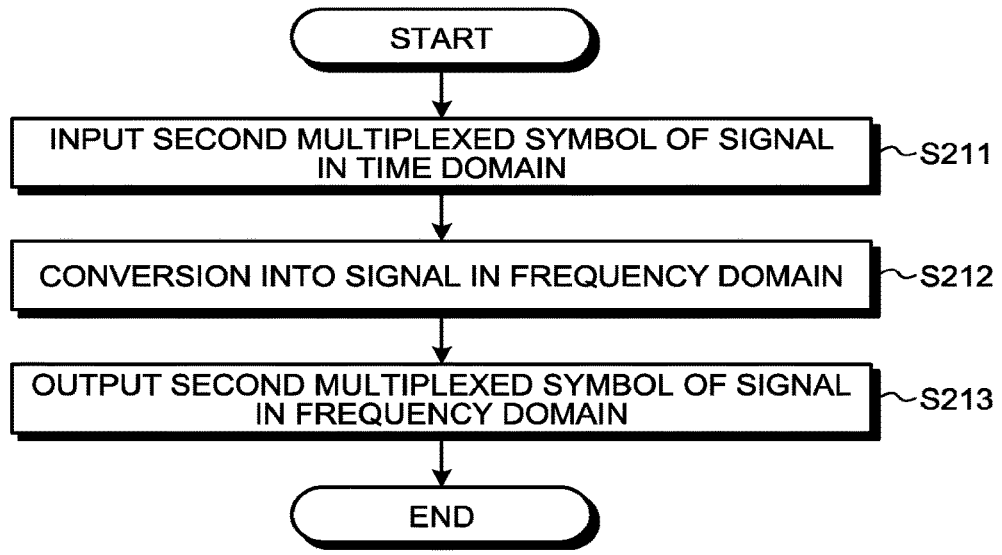
FIG. 33 is a flowchart showing the operation of the DFT unit of the transmission apparatus according to the second embodiment.

The DFT unit 424 is a Fourier transform unit that performs Fourier transform processing for converting the second multiplexed symbol formed of $N_D/2$ symbols inputted from the multiplexing unit 423 from a signal in a time domain into a signal in a frequency domain. The DFT unit 424 outputs the second multiplexed symbol that is the signal in the frequency domain after the conversion, to the multiplexing unit 43. FIG. 33 is a flowchart showing the operation of the DFT unit 424 of the transmission apparatus 10a according to the second embodiment. After the second multiplexed symbol of the signal in the time domain is inputted from the multiplexing unit 423 (step S211), the DFT unit 424 performs the Fourier transform processing on the second multiplexed symbol of the signal in the time domain to convert the second multiplexed symbol from the signal in the time domain into a signal in a frequency domain (step S212), and outputs the second multiplexed symbol of the signal in the frequency domain (step S213).

Figure 34:
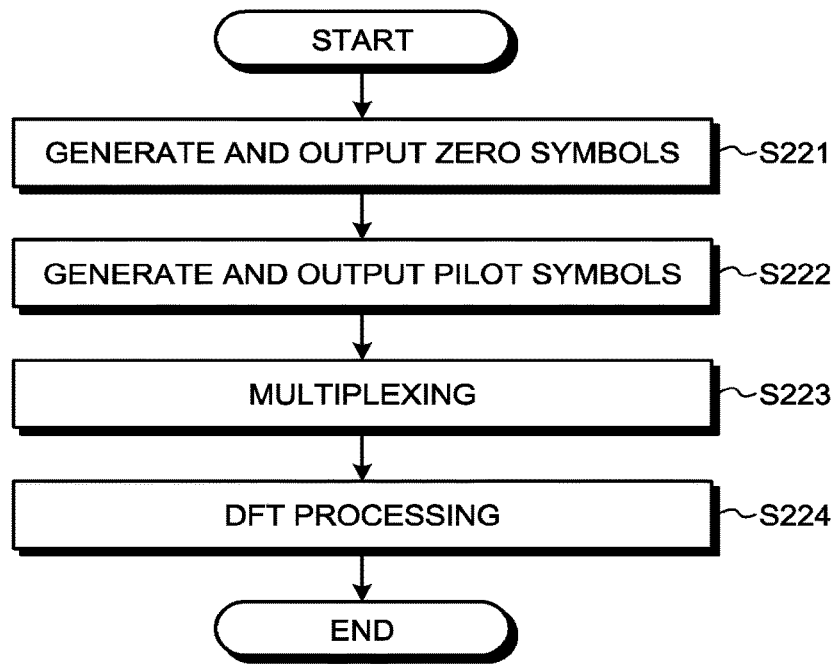
FIG. 34 is a flowchart showing the operation of a pilot-symbol processing unit of the transmission apparatus according to the second embodiment.

FIG. 34 is a flowchart showing the operation of the pilot-symbol processing unit 42 of the transmission apparatus 10a according to the second embodiment. In the pilot-symbol processing unit 42, the zero generating unit 421 generates and outputs zero symbols (step S221) and the pilot generating unit 422 generates and outputs pilot symbols (step S222). The multiplexing unit 423 multiplexes the zero symbols inputted from the zero generating unit 421 and the pilot symbols inputted from the pilot generating unit 422 (step S223). Then, the DFT unit 424 performs DFT processing for converting a second multiplexed symbol generated by the multiplexing into a signal in a frequency domain (step S224).

Figure 35:
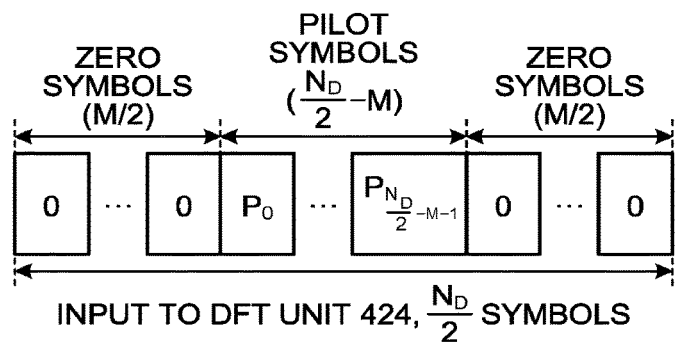
FIG. 35 is a diagram showing an example of the configuration of a pilot block including pilot symbols, which is outputted from the multiplexing unit to the DFT unit of the transmission apparatus according to the second embodiment.

FIG. 35 is a diagram showing an example of the configuration of a pilot block including pilot symbols, which is outputted from the multiplexing unit 423 to the DFT unit 424 of the transmission apparatus 10a according to the second embodiment. Compared with the configuration of the pilot block in the first embodiment shown in FIG. 19, the part for the fixed sequence symbols is replaced with zeros. The number of symbols of the pilot symbols is different.

Figure 36:
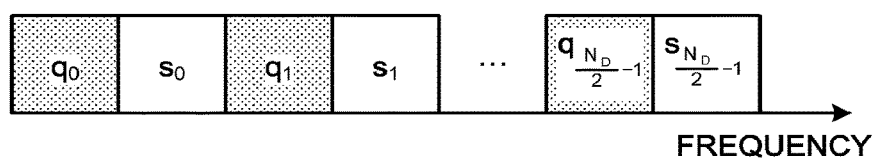
FIG. 36 is a chart showing an example of the configuration of a multiplexed block outputted from the multiplexing unit to an interpolation processing unit of the transmission apparatus according to the second embodiment.

The multiplexing unit 43 is a pre-interpolation multiplexed block generating unit that multiplexes, in a frequency domain, the first multiplexed symbol after the conversion into the signal in the frequency domain, inputted from the data-symbol processing unit 41 and the second multiplexed symbol after the conversion into the signal in the frequency domain, inputted from the pilot-symbol processing unit 42 to generate a pre-interpolation multiplexed block that is an SC block including data symbols and pilot symbols. The multiplexing unit 43 outputs the generated pre-interpolation multiplexed block to the interpolation processing unit 25. The pre-interpolation multiplexed block is a block before the interpolation processing is performed by the interpolation processing unit 25. Note that a multiplexed block is a block applied with the interpolation processing by the interpolation processing unit 25 and outputted from the IDFT unit 26. When $N_D/2$ symbols of the first multiplexed symbol inputted from the data-symbol processing unit 41 are represented as symbols $s_0, \ldots,$ and $s_{N_D/2-1}$ ($N_D$ is denoted as ND in the subscript) and $N_D/2$ symbols of the second multiplexed symbol inputted from the pilot-symbol processing unit 42 are represented as symbols $q_0, \ldots,$ and $q_{N_D/2-1}$ ($N_D$ is denoted as ND in the subscript), the multiplexed block outputted from the multiplexing unit 43 can be represented as shown in FIG. 36. FIG. 36 is a chart showing an example of the configuration of the multiplexed block outputted from the multiplexing unit 43 to the interpolation processing unit 25 of the transmission apparatus 10a according to the second embodiment. Note that, in the multiplexing unit 43, the alternate arrangement of the symbols constituting the first multiplexed symbol and the second multiplexed symbol on frequency is one example, and the arrangement of the symbols is not limited to the example shown in FIG. 36.

In the interpolation processing unit 25 and the IDFT unit 26, a type of the inputted SC block is different from the type in the first embodiment. However, the operations themselves in the components are the same as those in the first embodiment.

Note that, in this embodiment, in order to generate the pre-interpolation multiplexed block from the $N_D$ symbols in the multiplexing unit 43, the first multiplexed symbol formed of the $N_D/2$ symbols is outputted from the data-symbol processing unit 41 and the second multiplexed symbol formed of the $N_D/2$ symbols is outputted from the pilot-symbol processing unit 42. However, this is one example and the present invention is not limited to this example. The number of symbols of the first multiplexed symbol outputted from the data-symbol processing unit 41 and the number of symbols of the second multiplexed symbol outputted from the pilot-symbol processing unit 42 may be set to different numbers of symbols. In this embodiment, for simplification of explanation, it is contemplated that the data-symbol processing unit 41 generates and outputs the first multiplexed symbol formed of the $N_D/2$ symbols and the pilot-symbol processing unit 42 generates and outputs the second multiplexed symbol formed of the $N_D/2$ symbols.

Figure 37:
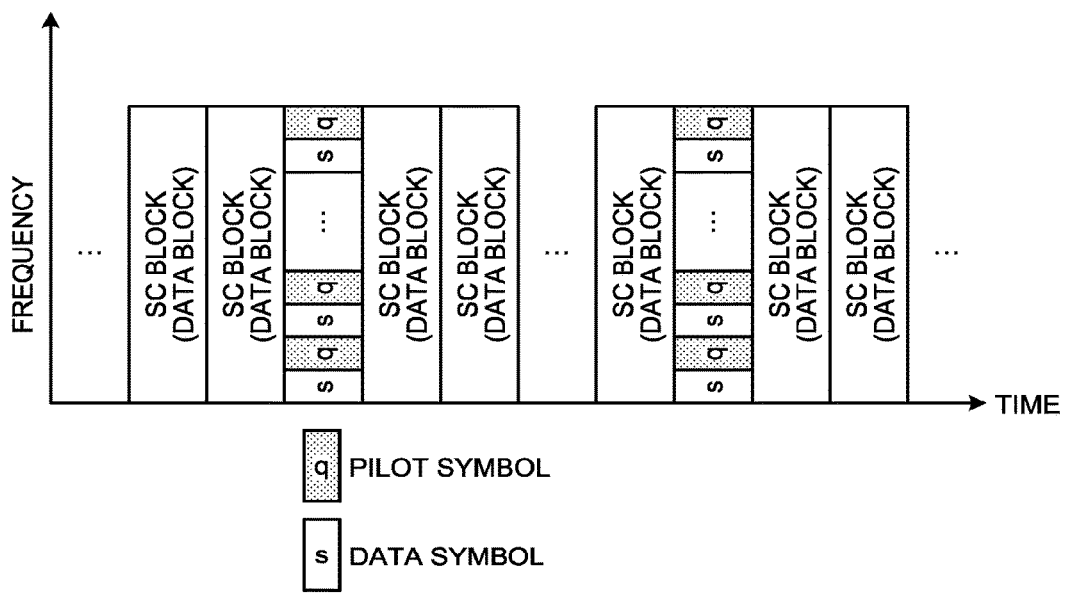
FIG. 37 is a chart showing SC blocks multiplexed in a time domain, which are outputted from an output control unit of the transmission apparatus according to the second embodiment.

FIG. 37 is a chart showing SC blocks multiplexed in a time domain, which are outputted from the output control unit 3 of the transmission apparatus 10a according to the second embodiment. FIG. 37 corresponds to FIG. 20 in the first embodiment. A data block is inputted to the output control unit 3 from the data-block generating unit 1 and a multiplexed block that is a type of a pilot block is inputted to the output control unit 3 from the pilot-block generating unit 2. The transmission apparatus 10a periodically transmits the multiplexed block during transmission of the data block. A frequency of the transmission of the multiplexed block with respect to the data block is based on content of control information outputted from the control unit 31 of the output control unit 3. Note that, in the transmission apparatus 10a, the periodical transmission of the multiplexed block is an example, and the multiplexed block may be non-periodically transmitted. In this case, the control unit 31 of the output control unit 3 generates control information for non-periodically outputting the multiplexed block generated by the pilot-block generating unit 2 and outputs the control information to the output unit 32.

Figure 38:
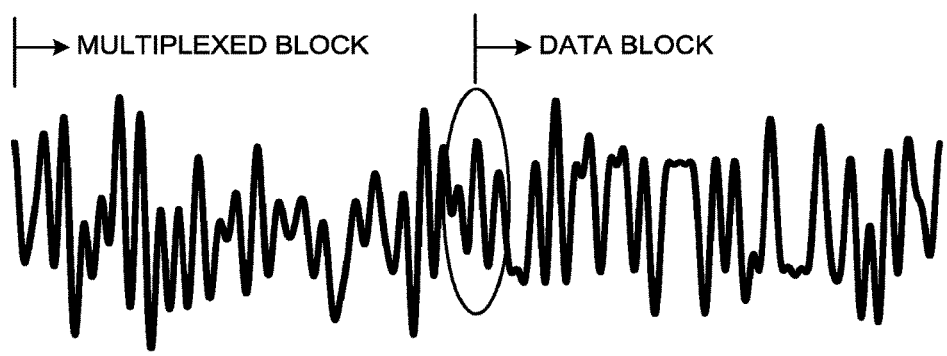
FIG. 38 is a chart showing an example of waveforms of a multiplexed block and a data block that are transmitted from the transmission apparatus according to the second embodiment.

FIG. 38 is a chart showing an example of waveforms of a multiplexed block and a data block transmitted from the transmission apparatus 10a according to the second embodiment. FIG. 38 corresponds to FIG. 21 in the first embodiment. In the transmission apparatus 10a, even for the multiplexed block obtained by multiplexing the pilot block and the data block as explained above, it is possible to secure continuity of phases in the boundary between the multiplexed block and the data block.

Figure 39:
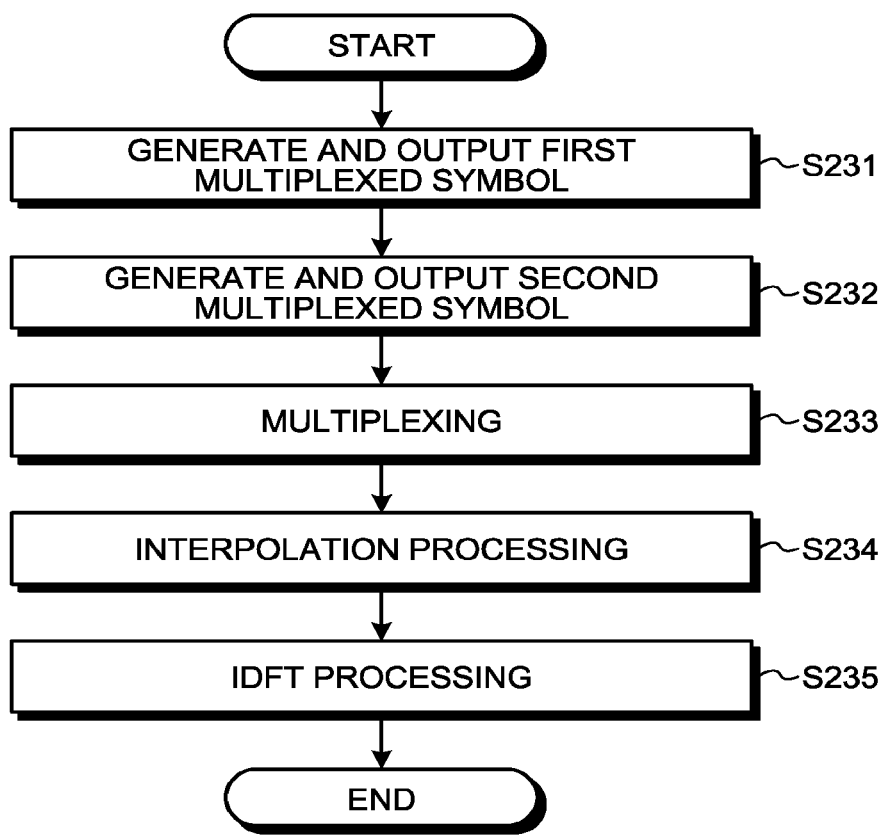
FIG. 39 is a flowchart showing the operation of a pilot-block generating unit of the transmission apparatus according to the second embodiment.

FIG. 39 is a flowchart showing the operation of the pilot-block generating unit 2a of the transmission apparatus 10a according to the second embodiment. In the pilot-block generating unit 2a, the data-symbol processing unit 41 generates and outputs a first multiplexed symbol (step S231), and the pilot-symbol processing unit 42 generates and outputs a second multiplexed symbol (step S232). The multiplexing unit 43 multiplexes the first multiplexed symbol inputted from the data-symbol processing unit 41 and the second multiplexed symbol inputted from the pilot-symbol processing unit 42 (step S233). Then, the interpolation processing unit 25 performs interpolation processing on a pre-interpolation multiplexed block generated by the multiplexing (step S234). The IDFT unit 26 converts outputs of the interpolation processing unit 25 into a signal in a time domain (step S235). Note that detailed operations of the components are based on flowcharts of the components.

Note that, in this embodiment, in the pilot-block generating unit 2a of the transmission apparatus 10a, the total number of symbols inputted to the multiplexing unit 43 from the data-symbol processing unit 41 and the pilot-symbol processing unit 42 is $N_D$, which is equal to the number of symbols inputted to the multiplexing unit 13 of the data-block generating unit 1, but the present invention is not limited to this example. The number of symbols inputted to the multiplexing unit 43 may be set to $N'_D$ that satisfies $N'_D \neq N_D$. However, when $N'_D$ is an even number, $N'_D/2 \geq M$ has to be satisfied.

In the pilot-symbol processing unit 42 of the transmission apparatus 10a, the multiplexing unit 432 before the input of the DFT unit 424 performs multiplexing of pilot symbols and zero symbols, that is, zero insertion into the pilot symbols. For transmission power adjustment, the multiplexing unit 423 may carry out normalization processing on pilot symbols before the input of the DFT unit 424.

In the pilot-symbol processing unit 42 of the pilot-block generating unit 2a shown in FIG. 27, zero symbols generated by the zero generating unit 421 and pilot symbols generated by the pilot generating unit 422 are fixed. Therefore, it is unnecessary to perform multiplexing processing and DFT processing for each block.

For this reason, for the purpose of a computational amount reduction and a calculation time reduction, the second multiplexed symbol formed of the $N_D/2$ samples $q_0, \ldots,$ and $q_{ND/2-1}$ (ND is denoted as ND in the subscript) outputted from the DFT unit 424 in FIG. 27 may be saved in a storing unit and used. Although not shown in the figure, for convenience of explanation, a transmission apparatus in this case is represented as a transmission apparatus 10a'. In addition, a pilot-block generating unit in this case is represented as a pilot-block generating unit 2a', and a pilot-symbol processing unit in this case is represented as a pilot-symbol processing unit 42'.

Figure 40:
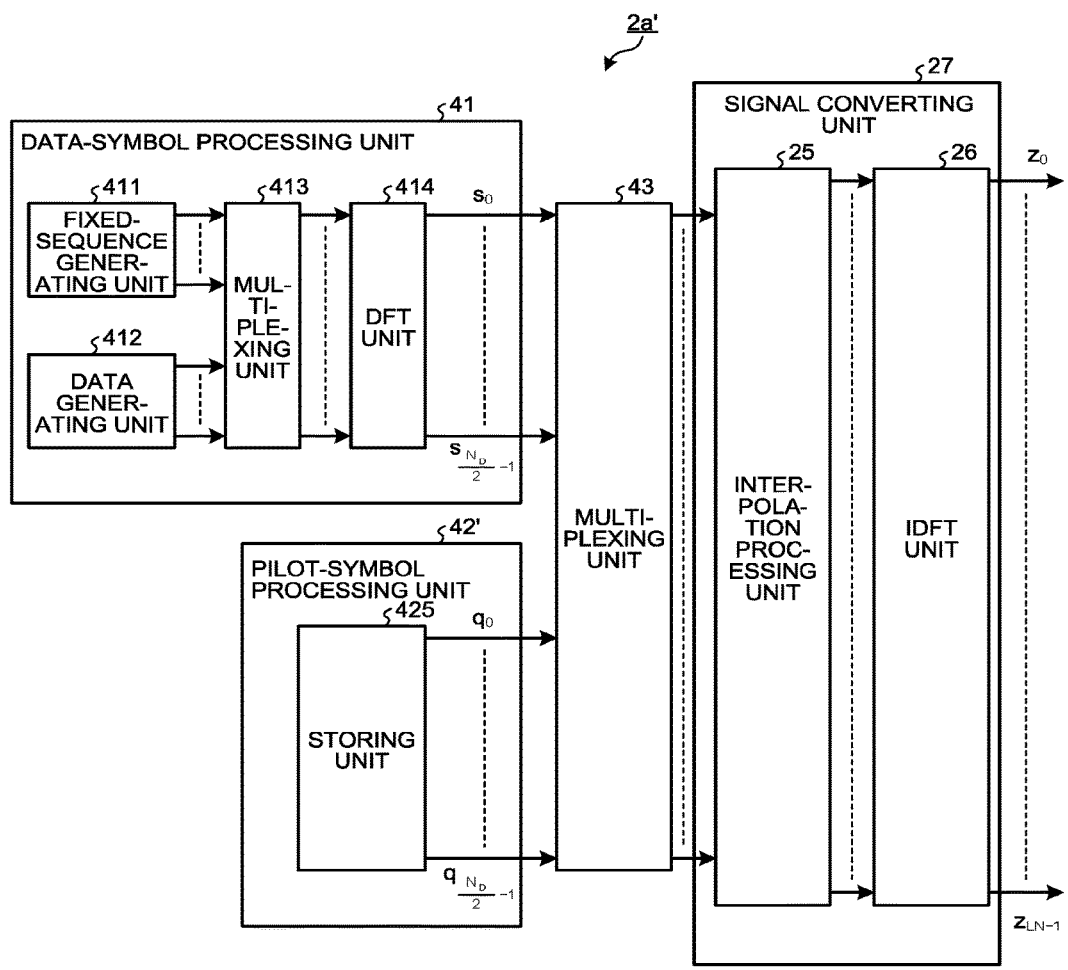
FIG. 40 is a block diagram showing a configuration example of the pilot-block generating unit of the transmission apparatus according to the second embodiment.

FIG. 40 is a block diagram showing a configuration example of the pilot-block generating unit 2a' of the transmission apparatus 10a' according to the second embodiment. The pilot-symbol processing unit 42' includes a storing unit 425. The storing unit 425 stores a second multiplexed symbol of a signal in a frequency domain, formed of $N_D/2$ symbols $q_0, \ldots,$ and $q_{ND/2-1}$ ($N_D$ is denoted as ND in the subscript), which is equal to a second multiplexed symbol of a signal in a frequency domain, formed of the $N_D/2$ symbols $q_0, \ldots,$ and $q_{ND/2-1}$ ($N_D$ is denoted as ND in the subscript) obtained by multiplexing, in the multiplexing unit 423, the zero symbols generated by the zero generating unit 421 and the pilot symbols generated by the pilot generating unit 422 and applying, in the DFT unit 424, the DFT processing to the second multiplexed symbol formed of the $N_D/2$ symbols after the multiplexing shown in FIG. 35, in the pilot-symbol processing unit 42 shown in FIG. 27. The storing unit 425 outputs the second multiplexed symbol of the frequency domain signal formed of the $N_D/2$ symbols according to readout of the multiplexing unit 43.

Figure 41:
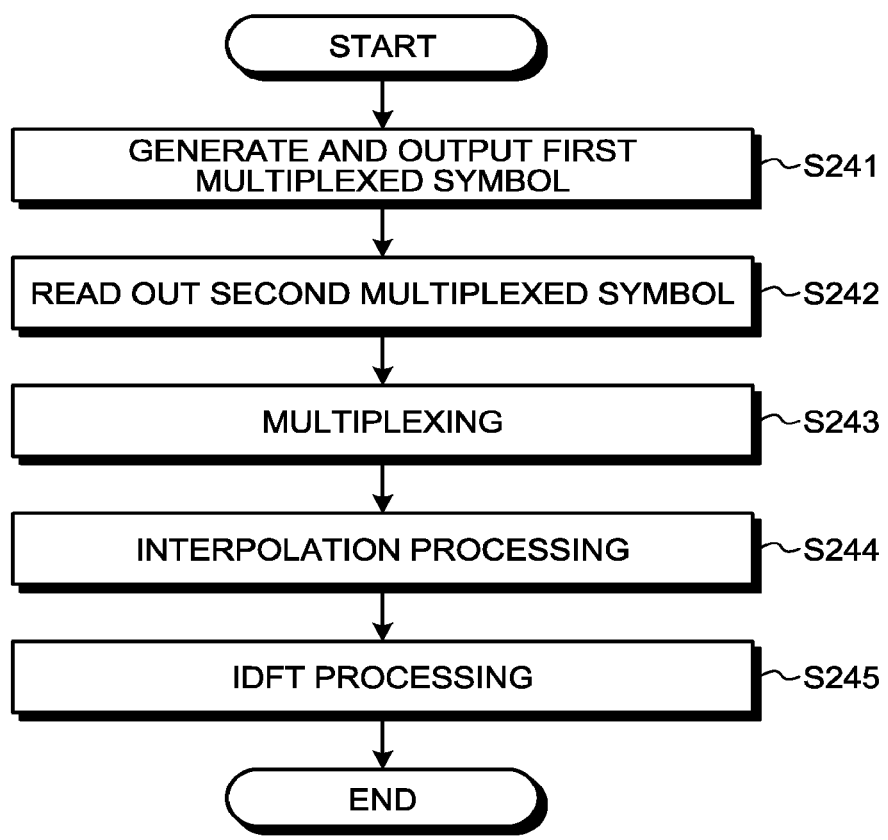
FIG. 41 is a flowchart showing the operation of the pilot-block generating unit of the transmission apparatus according to the second embodiment.

Description is given for the operation of the pilot-block generating unit 2a' performed when the pilot-symbol processing unit 42' includes the storing unit 425. FIG. 41 is a flowchart showing the operation of the pilot-block generating unit 2a' of the transmission apparatus 10a' according to the second embodiment. In the pilot-block generating unit 2a', the data-symbol processing unit 41 generates and outputs a first multiplexed symbol (step S241), and the multiplexing unit 43 reads out a second multiplexed symbol stored in the pilot-symbol processing unit 42' (step S242). The multiplexing unit 43 multiplexes the first multiplexed symbol generated by the data-symbol processing unit 41 and the second multiplexed symbol stored in the pilot-symbol processing unit 42' (step S243). The, the interpolation processing unit 25 performs interpolation processing on a pre-interpolation multiplexed block generated by the multiplexing (step S244), and the IDFT unit 26 converts the outputs of the interpolation processing unit 25 into a signal in a time domain (step S245). Note that detailed operations of the components are based on flowcharts of the components.

A hardware configuration of the transmission apparatus 10a is the same as the configuration of the transmission apparatus 10 in the first embodiment. For example, the fixed-sequence generating unit 411 has a configuration same as the configuration of the fixed-sequence generating unit 11. The data generating unit 412 has a configuration same as the configuration of the data generating unit 12. The multiplexing units 43, 413, and 423 each have a configuration same as the configuration of the multiplexing units 13 and 23. The DFT unit 414 has a configuration same as the configuration of the DFT units 14 and 24. The pilot generating unit 422 has a configuration same as the configuration of the pilot generating unit 22. Note that the zero generating unit 421 may be realized by the processing circuit 91 or CPU 92 and the memory 93, or may be realized by a modulator. The storing unit 425 is realized by a memory, for example.

As explained above, according to this embodiment, when generating the SC block including the pilot symbols, the transmission apparatuses 10a and 10a' multiplex, on frequency, the first multiplexed symbol obtained by multiplexing the fixed sequence symbols and the data symbols in a time domain and the second multiplexed symbol obtained by multiplexing the zero symbols and the pilot symbols in a time domain. Consequently, in the transmission apparatuses 10a and 10a', it is possible to increase an amount of data to be transmitted as compared with the first embodiment while eliminating phase discontinuity between SC blocks.

Third Embodiment. In this embodiment, description is given for a method different from that in the second embodiment in the case of generating a multiplexed block that is an SC block obtained by subjecting data symbols and pilot symbols to frequency-multiplex. Specifically, in this embodiment, a result obtained by multiplexing zero symbols and data symbols is represented as a first multiplexed symbol, and a result obtained by multiplexing fixed sequence symbols and pilot symbols is represented as a second multiplexed symbol.

In the third embodiment, the configuration of the transmission apparatus 10 is the same as the configuration in the first embodiment shown in FIG. 1. However, in the third embodiment, the pilot-block generating unit 2 is replaced with a pilot-block generating unit 2b. As with the pilot-block generating unit 2a in the second embodiment, the pilot-block generating unit 2b generates a multiplexed block that is a type of a pilot block including pilot symbols and is an SC block obtained by multiplexing pilot symbols and data symbols in a frequency domain, and outputs the multiplexed block. Although not shown in the figure, for convenience of explanation, a transmission apparatus in the third embodiment is represented as a transmission apparatus 10b.

Figure 42:
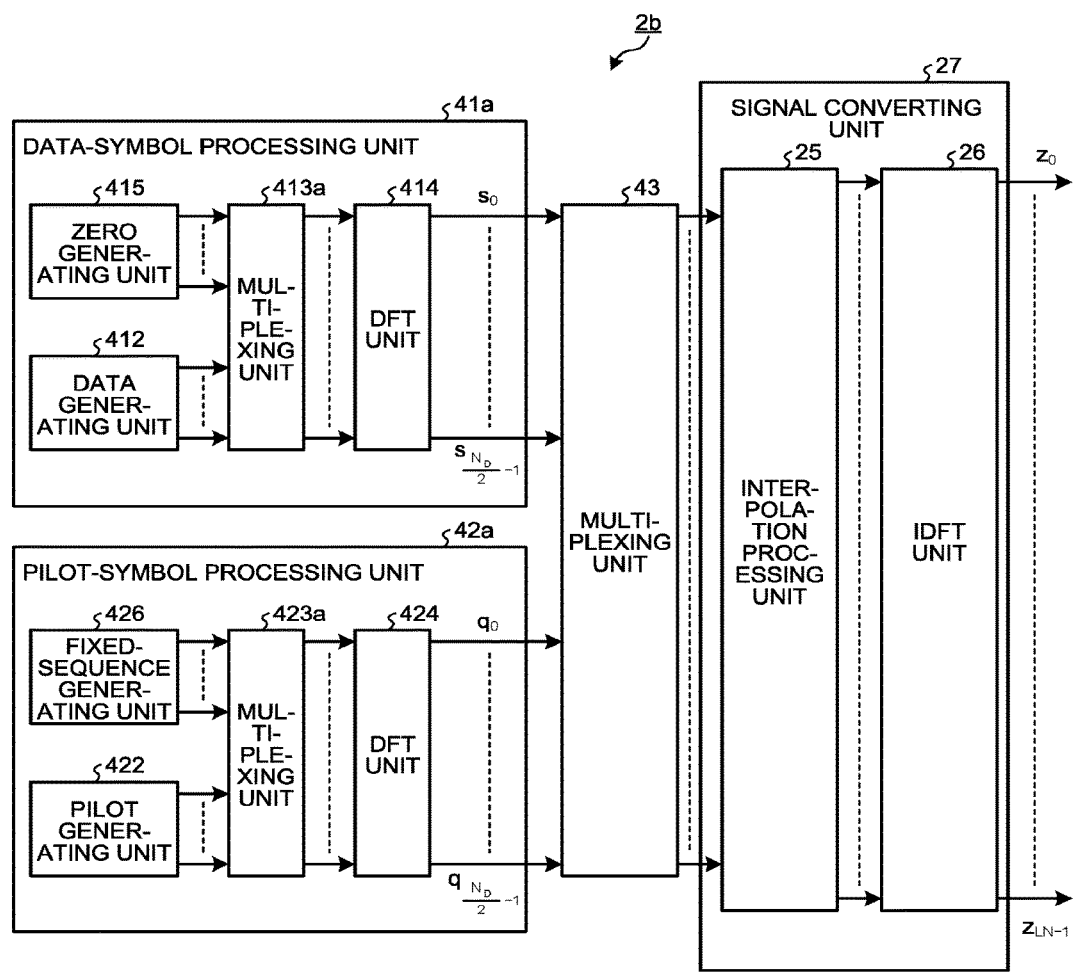
FIG. 42 is a block diagram showing a configuration example of a pilot-block generating unit of a transmission apparatus according to a third embodiment.

FIG. 42 is a block diagram showing a configuration example of a pilot-block generating unit 2b of the transmission apparatus 10b according to the third embodiment. The pilot-block generating unit 2b includes a data-symbol processing unit 41a, a pilot-symbol processing unit 42a, the multiplexing unit 43, the interpolation processing unit 25, and the IDFT unit 26. The interpolation processing unit 25 and the IDFT unit 26 constitute the signal converting unit 27.

The data-symbol processing unit 41a includes a zero generating unit 415, the data generating unit 412, a multiplexing unit 413a, and the DFT unit 414.

The zero generating unit 415 is a zero-for-first-multiplexed-symbol generating unit that generates zero symbols that are symbols having signal values of zero values, and outputs the generated zero symbols to the multiplexing unit 413a. The configuration of the zero generating unit 415 is the same as the configuration of the zero generating unit 421 explained above. A flowchart of an operation in the zero generating unit 415 is equivalent to the flowchart of the zero generating unit 421 shown in FIG. 31.

Figure 43:
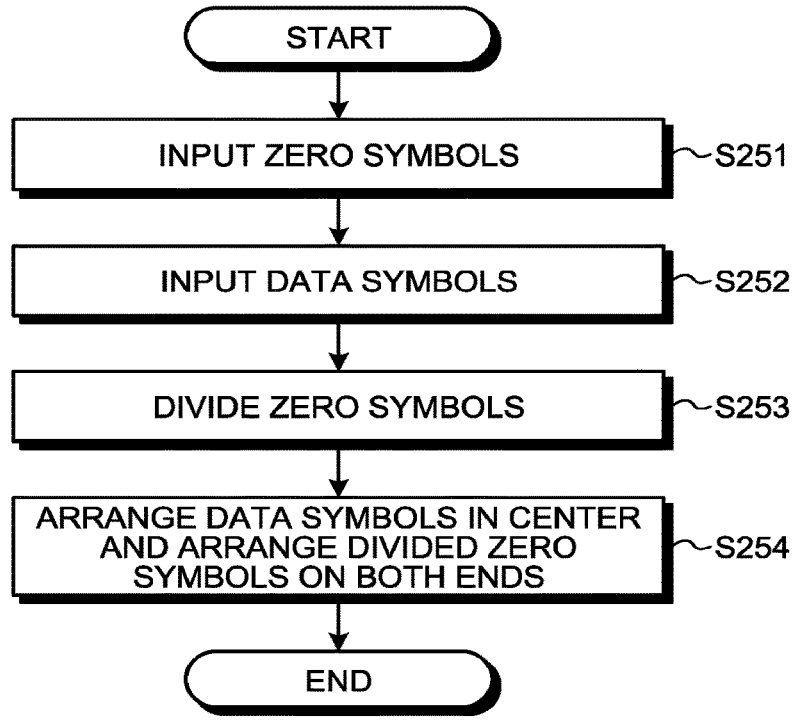
FIG. 43 is a flowchart showing the operation of a multiplexing unit of the transmission apparatus according to the third embodiment.

The multiplexing unit 413a is a first-multiplexed-symbol generating unit that multiplexes, in a time domain, the zero symbols inputted from the zero generating unit 415 and the data symbols inputted from the data generating unit 412 to generate a first multiplexed symbol including the data symbols, and outputs the generated first multiplexed symbol to the DFT unit 414. Herein, the number of symbols of the first multiplexed symbol is set to $N_D/2$, the number of symbols of the zero symbols included in the first multiplexed symbol is set to M, and the number of symbols of the data symbols is set to $N_D/2-M$. The multiplexing unit 413a arranges the $N_D/2-M$ data symbols in the center of the first multiplexed symbol. The multiplexing unit 413 divides the M zero symbols into halves, and for arrangement of the zero symbols in the first multiplexed symbol, arranges M/2 zero symbols in a head part of the first multiplexed symbol before the $N_D/2-M$ data symbols arranged in the center of the first multiplexed symbol and arranges M/2 zero symbols in a tail part of the first multiplexed symbol behind the $N_D/2-M$ data symbols. Note that, concerning the zero symbols arranged in the first multiplexed symbol, the number of symbols may be different between the head part and the tail part. For example, the number of symbols of the zero symbols in the head part can be set to M' and the number of symbols of the zero symbols in the tail part may be set to M" to unbalance the arrangement. However, M=M'+M" and M'≠M" have to be satisfied. In the following explanation, for simplification of explanation, it is contemplated that the number of symbols of the zero symbols arranged in the first multiplexed symbol is M/2 for both of the head part and the tail part. FIG. 43 is a flowchart showing the operation of the multiplexing unit 413a of the transmission apparatus 10b according to the third embodiment. Zero symbols are inputted to the multiplexing unit 413a from the zero generating unit 415 (step S251). Data symbols are inputted to the multiplexing unit 413a from the data generating unit 412 (step S252). The multiplexing unit 413a divides the zero symbols (step S253), arranges the data symbols in the center, and arranges the divided zero symbols on both ends of the data symbols (step S254).

Figure 44:
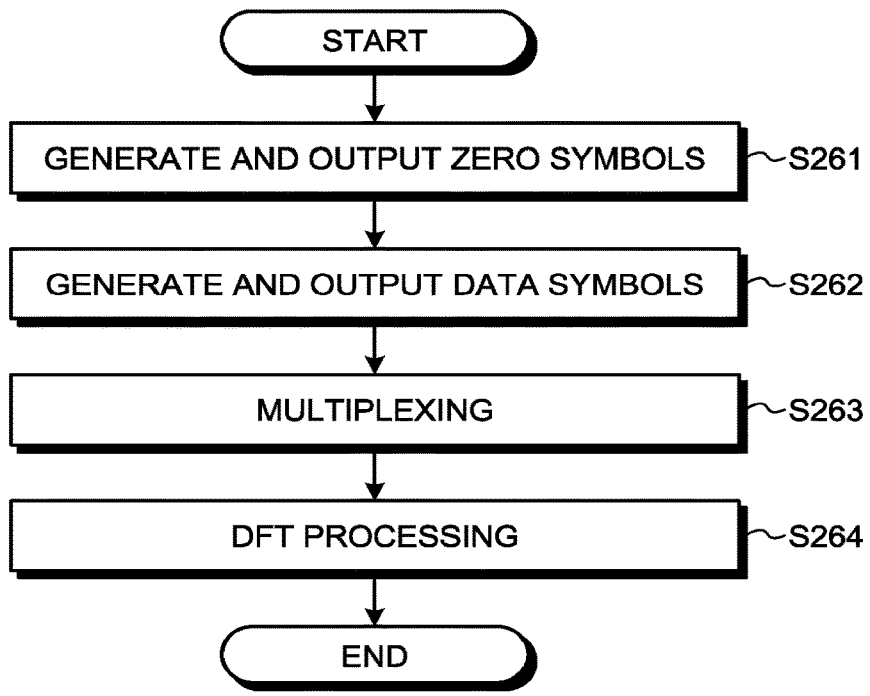
FIG. 44 is a flowchart showing the operation of a data-symbol processing unit of the transmission apparatus according to the third embodiment.

FIG. 44 is a flowchart showing the operation of the data-symbol processing unit 41a of the transmission apparatus 10b according to the third embodiment. In the data-symbol processing unit 41a, the zero generating unit 415 generates and outputs zero symbols (step S261), and the data generating unit 412 generates and outputs data symbols (step S262). The multiplexing unit 413a multiplexes the zero symbols inputted from the zero generating unit 415 and the data symbols inputted from the data generating unit 412 (step S263). Then, the DFT unit 414 performs DFT processing for converting a first multiplexed symbol generated by the multiplexing into a signal in a frequency domain (step S264).

Figure 45:
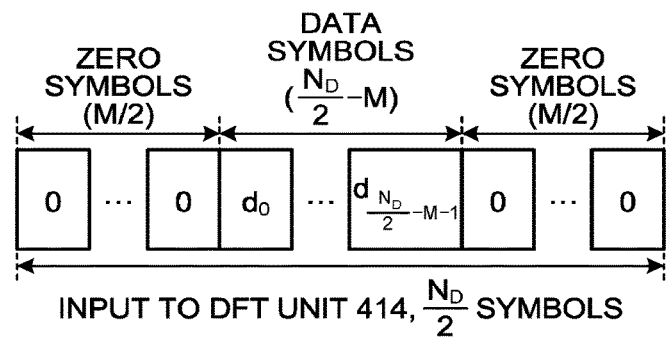
FIG. 45 is a diagram showing an example of the configuration of a first multiplexed symbol including data symbols, which is outputted from the multiplexing unit to a DFT unit of the transmission apparatus according to the third embodiment.

FIG. 45 is a diagram showing an example of the configuration of a first multiplexed symbol including data symbols, which is outputted from the multiplexing unit 413a to the DFT unit 414 of the transmission apparatus 10b according to the third embodiment. An m-th data symbol in the first multiplexed symbol is represented as $d_m$. Compared with the configuration of the first multiplexed symbol in the second embodiment shown in FIG. 30, a part for the fixed sequence symbols is replaced with zero symbols.

The configuration of the pilot-symbol processing unit 42a is explained. The pilot-symbol processing unit 42a includes a fixed-sequence generating unit 426, the pilot generating unit 422, a multiplexing unit 423a, and the DFT unit 424.

The fixed-sequence generating unit 426 is a fixed-sequence-for-second-multiplexed-symbol generating unit that generates zero symbols that are symbols having signal values of zero values and outputs the generated zero symbols to the multiplexing unit 423a. The configuration of the fixed-sequence generating unit 426 is the same as the configuration of the fixed-sequence generating units 21 and 411 described previously. A flowchart of an operation in the fixed-sequence generating unit 426 is equivalent to the flowchart of the fixed-sequence generating units 21 and 411 shown in FIG. 4.

The multiplexing unit 423a is a second-multiplexed-symbol generating unit that multiplexes, in a time domain, the fixed sequence symbols inputted from the fixed-sequence generating unit 426 and the pilot symbols inputted from the pilot generating unit 422 to generate a second multiplexed symbol including the pilot symbols and outputs the generated second multiplexed symbol to the DFT unit 424. Herein, the number of symbols of the second multiplexed symbol is set to $N_D/2$, the number of symbols of the fixed sequence symbols included in the second multiplexed symbol is set to M, and the number of symbols of the pilot symbols is set to $N_D/2-M$. The multiplexing unit 423a arranges the $N_D/2-M$ pilot symbols in the center of the second multiplexed symbol. The multiplexing unit 423a divides the M fixed sequence symbols into halves, and for arrangement of the fixed sequence symbols in the second multiplexed symbol, arranges M/2 symbols in the latter half of the fixed sequence symbols in a head part of the second multiplexed symbol before the $N_D/2-M$ pilot symbols arranged in the center of the second multiplexed symbol, and arranges M/2 symbols in the former half of the fixed sequence symbols in a tail part of the second multiplexed symbol behind the $N_D/2-M$ pilot symbols. The M/2 symbols in the latter half of the fixed sequence symbols are a latter half part of the fixed sequence symbols, while the M/2 symbols in the former half of the fixed sequence symbols are a former half part of the fixed sequence symbols. Note that, concerning the fixed sequence symbols arranged in the second multiplexed symbol, the number of symbols may be different between the head part and the tail part. For example, the number of symbols of the fixed sequence symbols in the head part may be set to M', and the number of symbols of the fixed sequence symbols of the tail part can be set to M" to unbalance the arrangement. However, M=M'+M" and M'≠M" have to be satisfied. In the following explanation, for simplification of explanation, it is contemplated that the number of symbols of the fixed sequence symbols arranged in the second multiplexed symbol is M/2 for both of the head part and the tail part. Although the number of symbols of pilot symbols to be treated and a name of a signal obtained after multiplexing are different, a flowchart of an operation in the multiplexing unit 423*a* is equivalent to the flowchart of the multiplexing unit 23 shown in FIG. 14.

Figure 46:
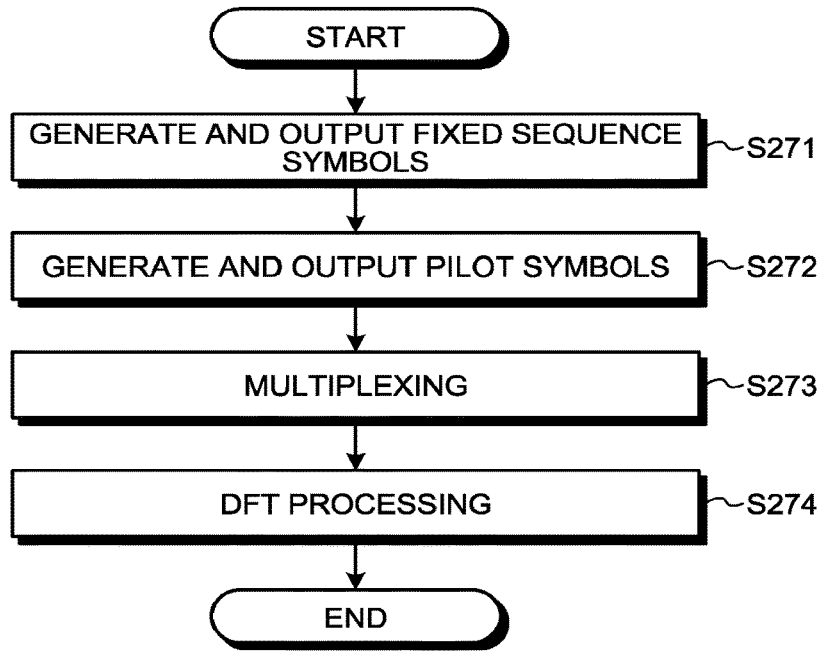
FIG. 46 is a flowchart showing the operation of a pilot-symbol processing unit of the transmission apparatus according to the third embodiment.

FIG. 46 is a flowchart showing the operation of the pilot-symbol processing unit 42*a* of the transmission apparatus 10*b* according to the third embodiment. In the pilot-symbol processing unit 42*a*, the fixed-sequence generating unit 426 generates and outputs fixed sequence symbols (step S271), and the pilot generating unit 422 generates and outputs pilot symbols (step S272). The multiplexing unit 423*a* multiplexes the fixed sequence symbols inputted from the fixed-sequence generating unit 426 and the pilot symbols inputted from the pilot generating unit 422 (step S273). Then, the DFT unit 424 performs DFT processing for converting a second multiplexed symbol generated by the multiplexing into a signal in a frequency domain (step S274).

Figure 47:
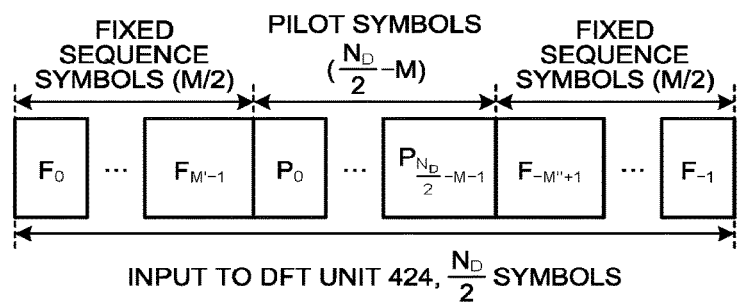
FIG. 47 is a diagram showing an example of the configuration of a second multiplexed symbol including pilot symbols, which is outputted from the multiplexing unit to the DFT unit of the transmission apparatus according to the third embodiment.

FIG. 47 is a diagram showing an example of the configuration of a second multiplexed symbol including pilot symbols, which is outputted from the multiplexing unit 423*a* to the DFT unit 424 of the transmission apparatus 10*b* according to the third embodiment. Compared with the configuration of the second multiplexed symbol in the second embodiment shown in FIG. 35, a part for the zero symbols is replaced with fixed sequence symbols.

Operations in the multiplexing unit 43, the interpolation processing unit 25, and the IDFT unit 26 are the same as in the second embodiment. A flowchart of an operation in the pilot-block generating unit 2*b* is equivalent to the flowchart of the pilot-block generating unit 2*a* shown in FIG. 39.

Note that, in this embodiment, in the pilot-block generating unit 2*b* of the transmission apparatus 10*b*, the total number of symbols from the data-symbol processing unit 41*a* and the pilot-symbol processing unit 42*a*, inputted to the multiplexing unit 43 is $N_D$, which is equal to the number of symbols inputted to the multiplexing unit 13 of the data-block generating unit 1, but the present invention is not limited to this example. The number of symbols inputted to the multiplexing unit 43 may be set to $N'_D$ that satisfies $N'_D \neq N_D$. However, when $N'_D$ is an even number, $N'_D/2 \geq M$ has to be satisfied.

In the data-symbol processing unit 41*a* of the transmission apparatus 10*b*, the multiplexing unit 413*a* before the input of the DFT unit 414 performs multiplexing of zero symbols and data symbols, that is, zero insertion into the data symbols. For transmission power adjustment, the multiplexing unit 413*a* may carry out normalization processing on data symbols before the input of the DFT unit 414.

In the pilot-symbol processing unit 42*a* of the pilot-block generating unit 2*b* shown in FIG. 42, fixed sequence symbols generated by the fixed-sequence generating unit 426 and pilot symbols generated by the pilot generating unit 422 are fixed. Therefore, it is unnecessary to perform multiplexing processing and DFT processing for each block. For this reason, for a computational amount reduction and a calculation time reduction, the second multiplexed symbol formed of the $N_D/2$ samples $q_0, \ldots,$ and $q_{ND/2-1}$ ($N_D$ is denoted as ND in the subscript) outputted from the DFT unit 424 in FIG. 42 may be saved in a storing unit and used. Although not shown in the figure, for convenience of explanation, a transmission apparatus in this case is represented as a transmission apparatus 10*b'*. In addition, a pilot-block generating unit in this case is represented as a pilot-block generating unit 2*b'*, and a pilot-symbol processing unit in this case is represented as a pilot-symbol processing unit 42*a'*.

Figure 48:
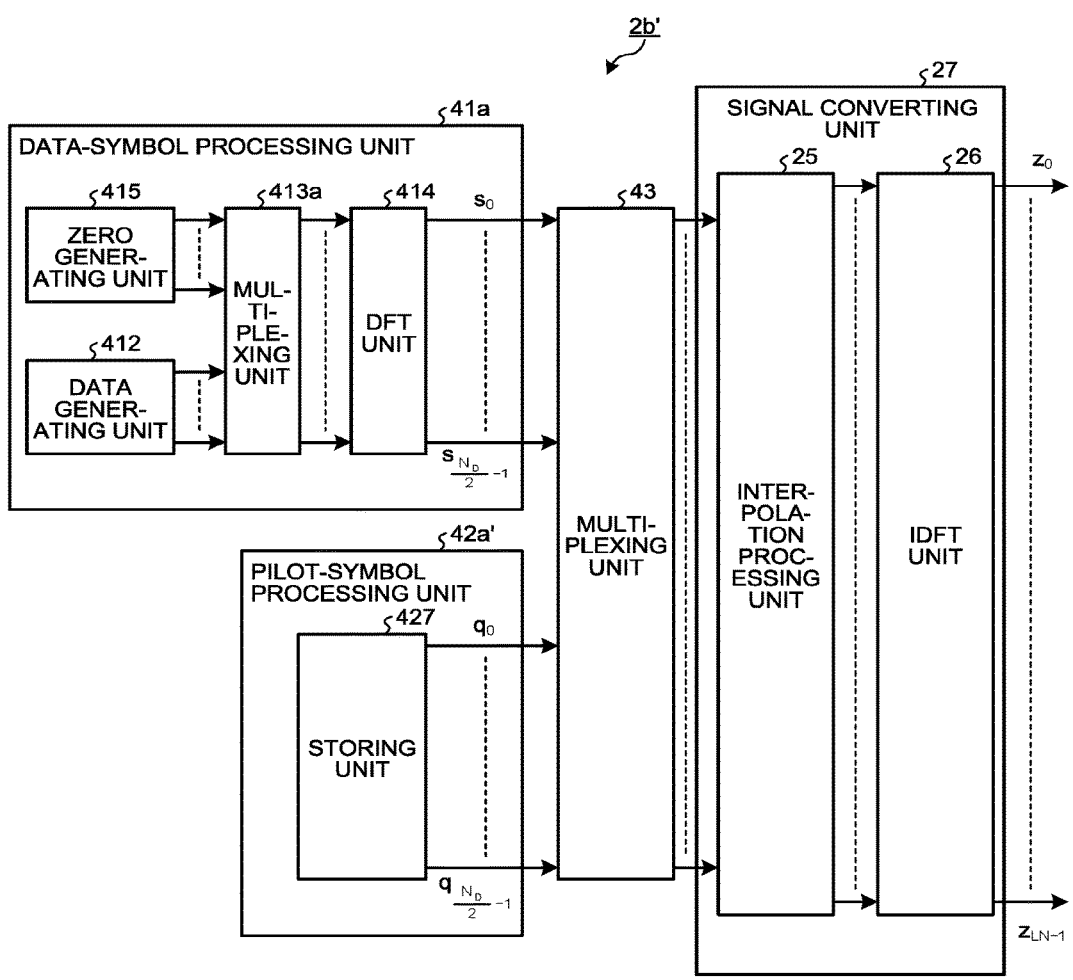
FIG. 48 is a block diagram showing a configuration example of the pilot-block generating unit of the transmission apparatus according to the third embodiment.

FIG. 48 is a block diagram showing a configuration example of the pilot-block generating unit 2*b'* of the transmission apparatus 10*b'* according to the third embodiment. The pilot-symbol processing unit 42*a'* includes a storing unit 427. The storing unit 427 stores a second multiplexed symbol of a signal in a frequency domain formed of $N_D/2$ symbols $q_0, \ldots,$ and $q_{ND/2-1}$ ($N_D$ is denoted as ND in the subscript), which is equal to the second multiplexed symbol of a signal in a frequency domain formed of the $N_D/2$ symbols $q_0, \ldots,$ and $q_{ND/2-1}$ ($N_D$ is denoted as ND in the subscript) obtained by multiplexing, in the multiplexing unit 423*a*, the fixed sequence symbols generated by the fixed-sequence generating unit 426 and the pilot symbols generated by the pilot generating unit 422 and applying, in the DFT unit 424, the DFT processing to the second multiplexed symbol formed of the $N_D/2$ symbols after the multiplexing shown in FIG. 47, in the configuration of the pilot-symbol processing unit 42*a* shown in FIG. 42. The storing unit 427 outputs the second multiplexed symbol of the frequency domain signal formed of the $N_D/2$ symbols according to readout of the multiplexing unit 43.

A flowchart of the operation of the pilot-block generating unit 2*b'* performed when the pilot-symbol processing unit 42*a'* includes the storing unit 427 is equivalent to the flowchart of the pilot-symbol processing unit 42' shown in FIG. 41.

A hardware configuration of the transmission apparatus 10*b* is equivalent to the configuration of the transmission apparatus 10 in the first embodiment. For example, the fixed-sequence generating unit 426 has a configuration same as the configuration of the fixed-sequence generating unit 11. The data generating unit 412 has a configuration same as the configuration of the data generating unit 12. The multiplexing units 43, 413*a*, and 423*a* each have a configuration same as the configuration of the multiplexing units 13 and 23. The DFT units 414 and 424 each have a configuration same as the configuration of the DFT units 14 and 24. The pilot generating unit 422 has a configuration same as the configuration of the pilot generating unit 22. Note that the zero generating unit 415 may be realized by the processing circuit 91 or CPU 92 and the memory 93, or may be realized by a modulator. The storing unit 427 is realized by a memory, for example.

As explained above, according to this embodiment, when generating the SC block including the pilot symbols, the transmission apparatuses 10*b* and 10*b'* multiplex, on frequency, the first multiplexed symbol obtained by multiplexing the zero symbols and the data symbols in the time domain and the second multiplexed symbol obtained by multiplexing the fixed sequence symbols and the pilot symbols in the time domain. Consequently, in the transmission apparatuses 10*b* and 10*b'*, as with the second embodiment, it is possible to increase the amount of data to be transmitted as compared with the first embodiment while eliminating phase discontinuity between SC blocks.

Fourth Embodiment

In this embodiment, description is given for a method different from that in the second and third embodiments in the case of generating a multiplexed block that is an SC block obtained by subjecting data symbols and pilot symbols to frequency-multiplex. Specifically, in this embodiment, a result obtained by multiplexing fixed sequence symbols and data symbols is represented as a first multiplexed symbol and a result obtained by multiplexing fixed sequence symbols and pilot symbols is represented as a second multiplexed symbol.

In the fourth embodiment, the configuration of the transmission apparatus 10 is the same as the configuration in the first embodiment shown in FIG. 1. However, in the fourth embodiment, the pilot-block generating unit 2 is replaced with a pilot-block generating unit 2c. As with the pilot-block generating units 2a and 2b in the second and third embodiments, the pilot-block generating unit 2c generates and outputs a multiplexed block that is a type of a pilot block including pilot symbols and is an SC block obtained by multiplexing pilot symbols and data symbols in a frequency domain. Although not shown in the figure, for convenience of explanation, a transmission apparatus in the fourth embodiment is represented as a transmission apparatus 10c.

Figure 49:
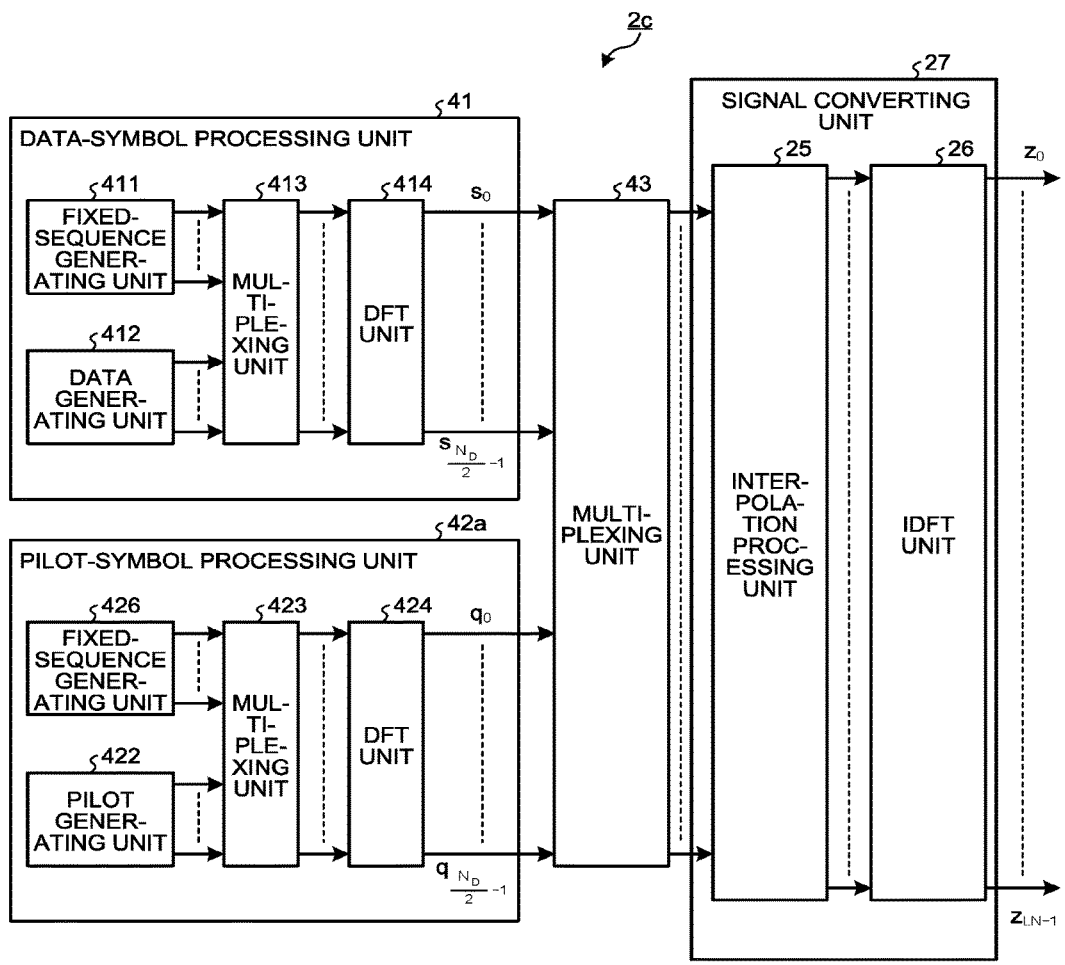
FIG. 49 is a block diagram showing a configuration example of a pilot-block generating unit of a transmission apparatus according to a fourth embodiment.
Figure 50:
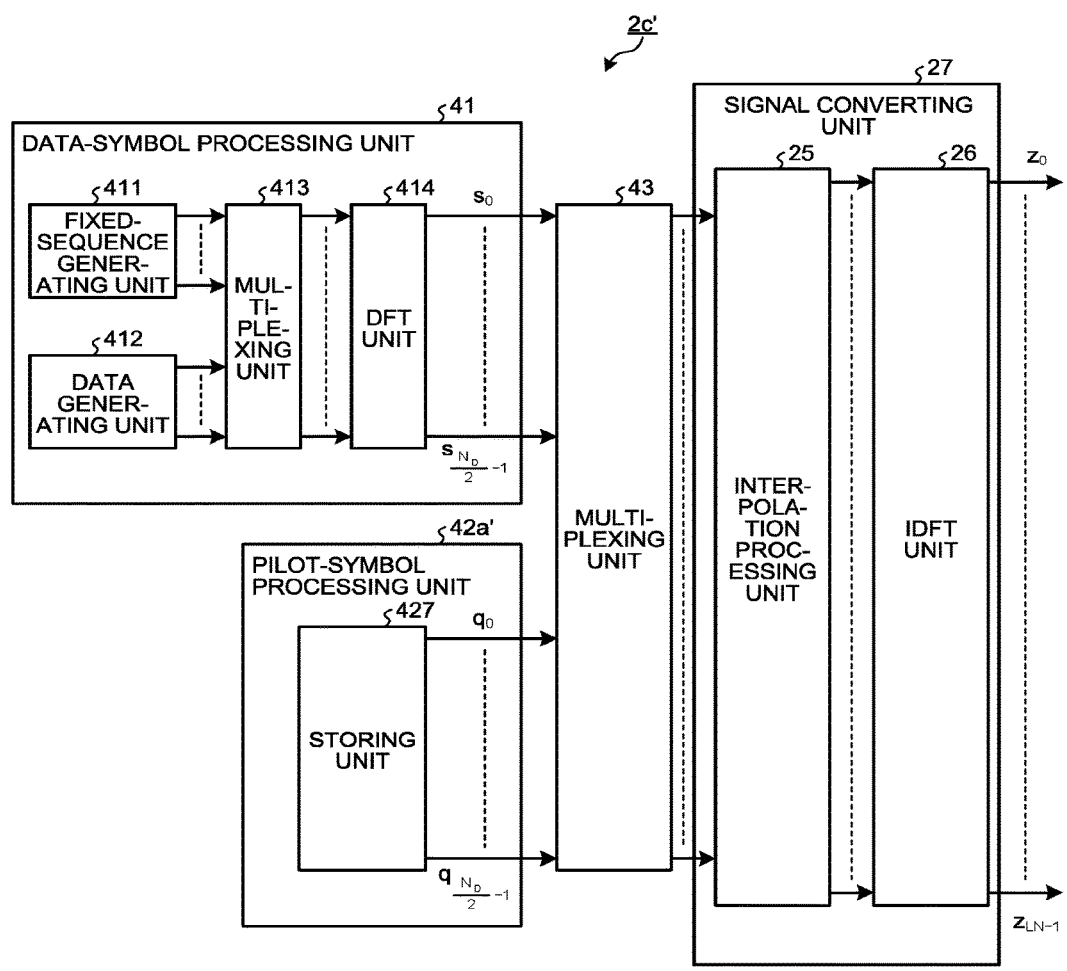
FIG. 50 is a block diagram showing another configuration example of the pilot-block generating unit of the transmission apparatus according to the fourth embodiment.

FIG. 49 is a block diagram showing a configuration example of the pilot-block generating unit 2c of the transmission apparatus 10c according to the fourth embodiment. The pilot-block generating unit 2c includes the data-symbol processing unit 41, the pilot-symbol processing unit 42a, the multiplexing unit 43, the interpolation processing unit 25, and the IDFT unit 26. As with the third embodiment, the pilot-symbol processing unit 42a can be replaced with the pilot-symbol processing unit 42a'. Although not shown in the figure, for convenience of explanation, a transmission apparatus in this case is represented as a transmission apparatus 10c'. In addition, a pilot-block generating unit in this case is represented as a pilot-block generating unit 2c', and a pilot-symbol processing unit in this case is represented as a pilot-symbol processing unit 42a'. FIG. 50 is a block diagram showing a configuration example of the pilot-block generating unit 2c' of the transmission apparatus 10c' according to the fourth embodiment. The pilot-block generating unit 2c' includes the data-symbol processing unit 41, the pilot-symbol processing unit 42a', the multiplexing unit 43, the interpolation processing unit 25, and the IDFT unit 26.

The data-symbol processing unit 41 is a unit used in the second embodiment. The pilot-symbol processing units 42a and 42a' are units used in the third embodiment.

That is, in the pilot-block generating units 2c and 2c', fixed sequence symbols are used for both of the first multiplexed symbol and the second multiplexed symbol to be generated. Components of the transmission apparatuses 10c and 10c' in this embodiment are equivalent to the components used in the first to third embodiments. Therefore, detailed explanation of the components is omitted.

As explained above, according to this embodiment, when generating the SC block including the pilot blocks, the transmission apparatuses 10c and 10c' multiplex, on frequency, the first multiplexed symbol obtained by multiplexing the fixed sequence symbols and the data symbols in the time domain and the second multiplexed symbol obtained by multiplexing the fixed sequence symbols and the pilot symbols in the time domain. Consequently, in the transmission apparatuses 10c and 10c', it is possible to increase the amount of data to be transmitted as compared with the first embodiment while eliminating phase discontinuity between SC blocks as with the second and third embodiments.

The configurations explained in the embodiments show examples of contents of the present invention. The configurations can be combined with other publicly-known techniques, and partially omitted or modified without departing from the scope of the present invention.

REFERENCE SIGNS LIST 1 data-block generating unit; 2, 2', 2a, 2a', 2b, 2b', 2c, 2c' pilot-block generating unit; 3 output control unit; 10 transmission apparatus; 11, 21, 411, 426 fixed-sequence generating unit; 12, 412 data generating unit; 13, 23, 43, 413, 413a, 423, 423a multiplexing unit; 14, 24, 414, 424 DFT unit; 15, 25 interpolation processing unit; 16, 26 IDFT unit; 17, 27 signal converting unit; 22, 422 pilot generating unit; 28, 425, 427 storing unit; 31 control unit; 32 output unit; 41, 41a data-symbol processing unit; 42, 42', 42a, 42a' pilot-symbol processing unit; 415, 421 zero generating unit.

The invention claimed is:

1. A transmission apparatus comprising:
   a data-block generator to generate a data block obtained by performing Fourier transform, interpolation, and inverse Fourier transform on a pre-interpolation data block that is a symbol sequence in which fixed sequence symbols having signal values formed of a fixed sequence are divided and the divided fixed sequence symbols are arranged on a head and a tail of data symbols;
   a pilot-block generator including a storing unit to store a pilot block obtained by performing Fourier transform, interpolation, and inverse Fourier transform on a pre-interpolation pilot block that is a symbol sequence in which the divided fixed sequence symbols are arranged on a head and a tail of pilot symbols that are fixed symbols known on a reception side, to output the pilot block; and
   an output controller to which the data block and the pilot block are inputted, to perform control for outputting either one of the data block and the pilot block.

2. The transmission apparatus according to claim 1, wherein the fixed sequence symbols are divided into two sequences having equal numbers of symbols and arranged on the head and the tail of the pilot symbols.

3. The transmission apparatus according to claim 1, wherein the fixed sequence symbols are divided into two sequences having different numbers of symbols and arranged on the head and the tail of the pilot symbols.

4. A transmission apparatus comprising:
   a pilot-block generator which includes:
      a data-symbol processor to generate a first multiplexed symbol in which fixed sequence symbols having signal values formed of a fixed sequence are divided and the divided fixed sequence symbols are arranged on a head and a tail of data symbols, and perform Fourier transform on the first multiplexed symbol to convert the first multiplexed symbol from a signal in a time domain into a signal in a frequency domain;
      a pilot-symbol processor including a storing unit to store a second multiplexed symbol in a frequency domain, obtained by conversion from a signal in a time domain by performing Fourier transform on a second multiplexed symbol in which the divided fixed sequence symbols are arranged on a head and a tail of pilot symbols that are fixed symbols known on a reception side, to output the second multiplexed symbol in a frequency domain;
      a pre-interpolation-multiplexed-block generator to generate a pre-interpolation multiplexed block obtained by multiplexing the first multiplexed symbol obtained by conversion into the signal in a frequency domain and the second multiplexed symbol in a frequency domain; and
      a signal converter to perform interpolation and inverse Fourier transform on the pre-interpolation multiplexed block, and output a multiplexed block after the interpolation processing;

a data-block generator to generate a data block obtained by performing Fourier transform, interpolation, and inverse Fourier transform on a pre-interpolation data block that is a symbol sequence in which the divided fixed sequence symbols are arranged in the head and the tail of the data symbols; and an output controller to which the data block and a pilot block are inputted, to perform control for outputting either one of the data block and the pilot block.

5. The transmission apparatus according to claim 4, wherein the fixed sequence symbols included in the second multiplexed symbol are zero symbols that are symbols having signal values of zero values.

6. The transmission apparatus according to claim 4, wherein the fixed sequence symbols included in the first multiplexed symbol are zero symbols that are symbols having signal values of zero values.

* * * * *